United States Patent
Tan

(10) Patent No.: US 10,884,652 B2
(45) Date of Patent: Jan. 5, 2021

(54) TRIM COMMAND RECORDING METHOD, MEMORY CONTROL CIRCUIT UNIT AND MEMORY STORAGE DEVICE

(71) Applicant: PHISON ELECTRONICS CORP., Miaoli (TW)

(72) Inventor: Kok-Yong Tan, Miaoli County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 199 days.

(21) Appl. No.: 16/004,443

(22) Filed: Jun. 11, 2018

(65) Prior Publication Data

US 2019/0324904 A1   Oct. 24, 2019

(30) Foreign Application Priority Data

Apr. 24, 2018   (TW) .............................. 107113813 A

(51) Int. Cl.
 *G06F 3/06* (2006.01)
 *G06F 12/02* (2006.01)

(52) U.S. Cl.
 CPC .......... *G06F 3/0652* (2013.01); *G06F 3/0614* (2013.01); *G06F 3/0679* (2013.01); *G06F 12/0246* (2013.01); *G06F 12/0253* (2013.01); *G06F 2212/1032* (2013.01); *G06F 2212/7201* (2013.01); *G06F 2212/7205* (2013.01)

(58) Field of Classification Search
 CPC ..... G06F 2212/7201; G06F 2212/7205; G06F 3/0679; G06F 12/0246; G06F 12/0253; G06F 3/0652
 See application file for complete search history.

(56) References Cited

U.S. PATENT DOCUMENTS

| | | | | |
|---|---|---|---|---|
| 2012/0059978 | A1* | 3/2012 | Rosenband | G06F 3/0613 711/103 |
| 2013/0219106 | A1* | 8/2013 | Vogan | G06F 12/0246 711/103 |
| 2014/0095767 | A1 | 4/2014 | Trika et al. | |
| 2016/0117252 | A1* | 4/2016 | Thangaraj | G06F 11/1441 711/118 |

OTHER PUBLICATIONS

"TN-29-28: Memory Management in NAND Flash Arrays Overview", 2005, Micron, Rev. A 7/07 EN, pp. 1-10 (Year: 2005).*
Cagdas Dirik, "Performance Analysis of NAND Flash Memory Solid-State Disks", 2009 University of Maryland—College Park, pp. 1-188 (Year: 2009).*
Office Action of Taiwan Counterpart Application, dated Jan. 29, 2019, pp. 1-6.

* cited by examiner

Primary Examiner — Reginald G Bragdon
Assistant Examiner — Curtis James Kortman
(74) Attorney, Agent, or Firm — JCIPRNET

(57) ABSTRACT

A trim command recording method, a memory control circuit unit and a memory storage device are provided. The method includes: receiving a write command from a host system; writing a data corresponding to the write command to a first physical programming unit of a first physical erasing unit in the plurality of physical erasing units; and when receiving a trim command from the host system, writing a trim command record corresponding to the trim command into a second physical programming unit of the first physical erasing unit.

15 Claims, 20 Drawing Sheets

| Lower physical programming unit | Middle physical programming unit | Upper physical programming unit |
|---|---|---|
| 0 | 1 | 2 |
| 3 | 4 | 5 |
| 6 | 7 | 8 |
| 9 | 10 | 11 |
| 12 | 13 | 14 |
| ⋮ | ⋮ | ⋮ |
| 255 | 256 | 257 |

TRIM COMMAND RECORDING METHOD, MEMORY CONTROL CIRCUIT UNIT AND MEMORY STORAGE DEVICE

CROSS-REFERENCE TO RELATED APPLICATION

This application claims the priority benefit of Taiwan application serial no. 107113813, filed on Apr. 24, 2018. The entirety of the above-mentioned patent application is hereby incorporated by reference herein and made a part of this specification.

BACKGROUND

Technical Field

The present invention is related to a trim command recording method, and particularly to a trim command recording method for rewritable non-volatile memory module and a memory control circuit unit and a memory storage device using the method.

Description of Related Art

Digital cameras, mobile phones and MP3 players have been developed rapidly for the past few years, and consumers' needs for storage media have grown significantly as well. Since a rewritable non-volatile memory is characterized in data non-volatility, power saving, minimized size, non-mechanical structure, fast reading/writing speed, it is highly suitable to be used for portable electronic products such as notebook computer. Solid state drive is a memory storage device using flash memory as storage medium. Therefore, flash memory industry has become prosperous among electronic industries in recent years.

Flash memory module has a plurality of physical erasing units, and each of the physical erasing units has a plurality of physical programming units, wherein it is required to write data according to the sequence of physical programming unit when writing data into the physical erasing unit. Additionally, the physical programming unit into which data is written needs to be erased first in order to be written with data. In particular, physical erasing unit is the minimum unit for erasing operation, and physical programming unit is the minimum unit for programming operation (also referred to as writing operation). Accordingly, in management of flash memory module, physical erasing unit is classified into data area and free area.

Physical erasing unit in data area is used for storing data stored in host system. Specifically, a memory control circuit in memory storage device converts logical address accessed by host system into logical address of logical block and maps the logical address of the logical block to physical programming unit of the physical erasing unit in data area. In other words, the physical erasing unit in data area in management of flash memory module is regarded as physical erasing unit that has been used (e.g., stores the data written by host system). For example, a memory control circuit unit uses a logical-physical address mapping table to record the mapping relationship between logical block and physical erasing unit in the data area, wherein the logical address in logical block corresponds to the mapped physical programming unit of physical erasing unit.

The physical erasing unit in free area is used to replace the physical erasing unit in the data area. Specifically, as mentioned above, the physical erasing unit that is written with data needs to be erased first to be written with data again; therefore, the physical erasing unit in the free area is designed to be written with data to replace the physical erasing unit of the mapped logical block. Accordingly, the physical erasing unit in the free area is empty or usable physical erasing unit, i.e., invalid data that has no recorded data or is marked as non-usable. In other words, the physical programming unit of the physical erasing unit in the data area and the free area maps the logical address of logical block in an alternating manner to store the data written by the host system.

In existing flash memory storing techniques, when the host system is to delete data on the logical address, a trim command is given by the host system to notify the memory control circuit unit which logical address on which the data is deleted. Generally speaking, when the memory control circuit unit receives a trim command from the host system, the memory control circuit unit does not immediately perform a trimming operation corresponding to the trim command to change mapping information in logical-physical mapping table, but stores a record corresponding to the trim command in a trim table in a volatile memory and sends a confirming message to the host system so as to respond to the trim command quickly. Thereafter, at an appropriate timing (e.g., when the memory control circuit unit is in a free state), the memory control circuit unit performs a trimming operation corresponding to the trim command according to the record in the volatile memory. It should be noted that, when an abnormal power-off event is occurred to the memory storage device, the trim table stored in the volatile memory is also lost. When the memory storage device is power-on, the memory control circuit unit is not capable of performing the trimming operation according to the trim command in the trim table, causing that the data which should be deleted from the logical address is still retained in the non-volatile memory and cannot be recycled, and the mapping information in the logical-physical mapping table cannot be changed according to the trim table. Therefore, it is a goal to be achieved by practitioners of the field to find out how to obtain the trim command record before the power-off event after the memory storage device is power-on and perform corresponding trimming operation.

SUMMARY

The present invention provides a trim command recording method, a memory control circuit unit and a memory storage device, which are capable of obtaining a trim command record before power-off event after the memory storage device is power-on and performing corresponding trimming operation, thereby avoiding the problem caused by loss of information in trim table after the power-off event.

The invention provides a trim command recording method used for a memory storage device. The memory storage device has a rewritable non-volatile memory module. The rewritable non-volatile memory module includes a plurality of physical erasing units. Each of the plurality of physical erasing units includes a plurality of physical programming units. The trim command recording method includes the following steps: receiving a write command from a host system; writing a data corresponding to the write command to a first physical programming unit of a first physical erasing unit of the plurality of physical erasing units; and when receiving the trim command from the host system, writing a trim command record corresponding to the trim command to a second physical programming unit of the first physical erasing unit.

The invention provides a memory control circuit unit. The memory control circuit unit includes a host interface, a memory interface and a memory management circuit. The host interface is coupled to a host system. The memory interface is coupled to a rewritable non-volatile memory module, wherein the rewritable non-volatile memory module includes a plurality of physical erasing units, each of the plurality of physical erasing units includes a plurality of physical programming units. The memory management circuit is coupled to the host interface and the memory interface and performs the following operations: receiving a write command from the host system; writing a data corresponding to the write command to a first physical programming unit of a first physical erasing unit of the plurality of physical erasing units; and when receiving a trim command from the host system, writing a trim command record corresponding to the trim command to a second physical programming unit of the first physical erasing unit.

In a memory storage device provided by the invention, the memory storage device includes a connecting interface unit, a rewritable non-volatile memory module and a memory control circuit unit. The connecting interface unit is coupled to a host system. The rewritable non-volatile memory module has a plurality of physical erasing units. Each of the plurality of physical erasing units includes a plurality of physical programming units; the memory control circuit unit is coupled to the connecting interface unit and the rewritable non-volatile memory module and performs the following operations: receiving a write command from the host system; writing a data corresponding to the write command to a first physical programming unit of a first physical erasing unit of the plurality of physical erasing units; and when receiving a trim command from the host system, writing a trim command record corresponding to the trim command to a second physical programming unit of the first physical erasing unit.

In summary, the trim command recording method, the memory control circuit unit and the memory storage device of the invention are capable of storing trim command record corresponding to trim command in the physical erasing unit that is currently used for writing operation when the memory management circuit receives the trim command. When the memory storage device is power-off and then power-on, the memory management circuit is capable of restoring the mapping information in logical-physical mapping table according to the stored trim command record, thereby avoiding the problem that trimming operation cannot be performed properly caused by loss of information in the trim table after the power-off event.

In order to make the aforementioned features and advantages of the disclosure more comprehensible, embodiments accompanying figures are described in detail below.

DESCRIPTION OF EMBODIMENTS

Generally speaking, a memory storage device (also referred to as a memory storage system) includes a rewritable non-volatile memory module and a controller (also referred to as a control circuit unit). Generally, the memory storage device is used along with a host system so that the host system can write the data into the memory storage device or read data from the memory storage device.

Figure 1:
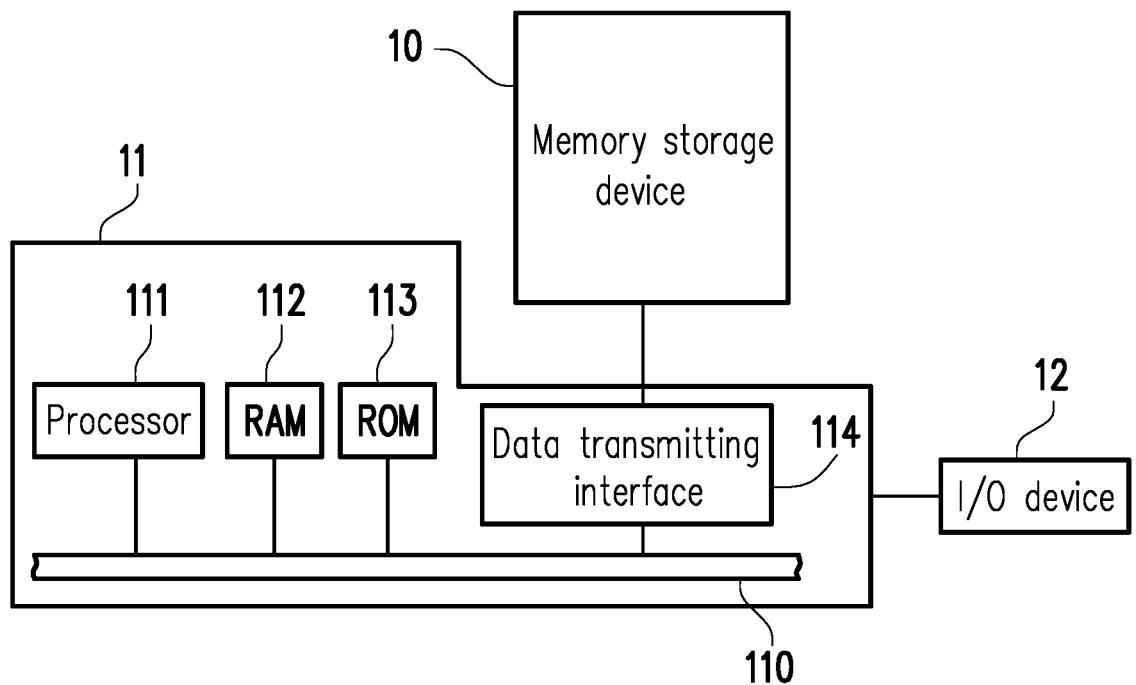
FIG. 1 is a schematic view of a host system, a memory storage device and an I/O device according to an exemplary embodiment.
Figure 2:
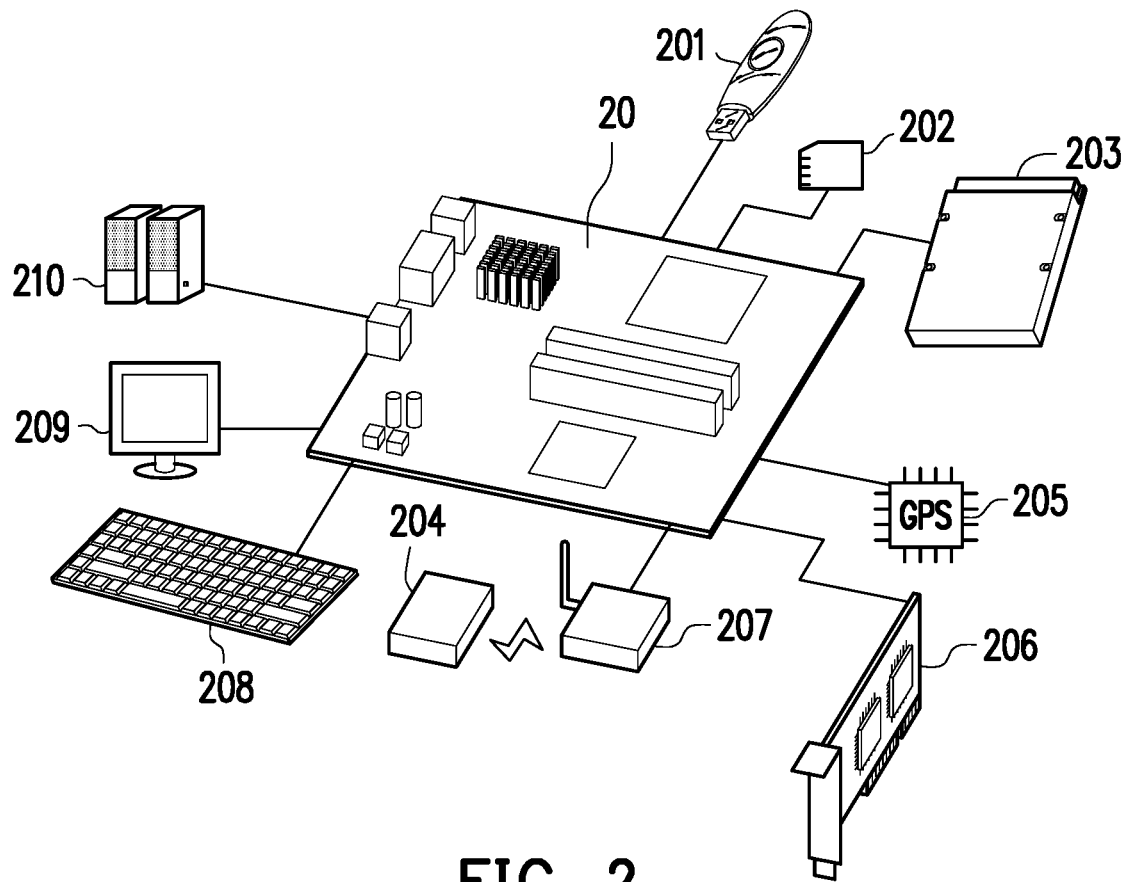
FIG. 2 is a schematic view of a host system, a memory storage device and an I/O device according to another exemplary embodiment.

FIG. 1 is a schematic view of a host system, a memory storage device and an I/O device according to an exemplary embodiment, and FIG. 2 is a schematic view of a host system, a memory storage device and an I/O device according to another exemplary embodiment.

Referring to FIG. 1 and FIG. 2, a host system 11 includes a processor 111, a random access memory (RAM) 112, a read-only memory (ROM) 113 and a data transmitting interface 114. The processor 111, the RAM 112, the ROM 113 and the data transmitting interface 114 are coupled to a system bus 110.

In an exemplary embodiment, the host system 11 is coupled to the memory storage device 10 via the data transmitting interface 114. For example, the host system 11 may write the data into the memory storage device 10 or read the data from the memory storage device 10 via the data transmitting interface 114. In addition, the host system 11 is coupled to an I/O device 12 via the system bus 110. For example, the host system 11 may transmit an output signal to the I/O device 12 or receive an input signal from the I/O device 12 via the system bus 110.

In the exemplary embodiment, the processor 111, the RAM 112, the ROM 113 and the data transmitting interface 114 may be disposed on a motherboard 20 of the host system 11. The number of the data transmitting interface 114 may be one or more. With the data transmitting interface 114, the motherboard 20 may be coupled to the memory storage device 10 via a wired or a wireless manner. The memory storage device 10 may be, for example, a flash drive 201, a memory card 202, a solid state drive (SSD) 203 or a wireless memory storage device 204. The wireless memory storage device 204 may be various memory storage devices that use wireless communication technology as basis such as a near field communication storage (NFC) memory storage device, a WiFi memory storage device, a Bluetooth memory storage device or a Bluetooth low energy memory storage device (i.e., iBeacon). In addition, the motherboard 20 may be coupled to various I/O devices such as a global positioning system (GPS) module 205, a network interface card 206, a wireless transmitting device 207, a keyboard 208, a screen 209, a speaker 210 and so on via the system bus 110. For example, in an exemplary embodiment, the motherboard 20 can access the wireless memory storage device 204 via the wireless transmitting device 207.

Figure 3:
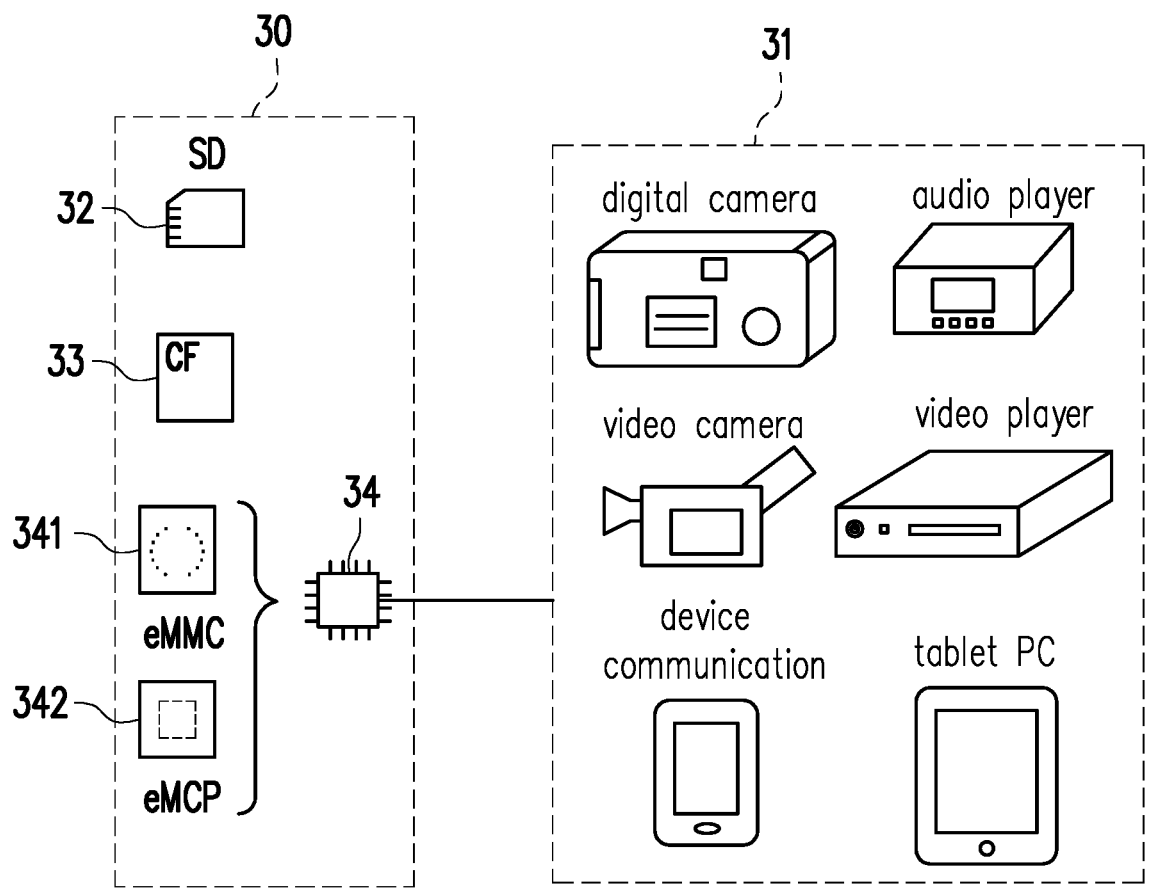
FIG. 3 is a schematic view of a host system and a memory storage device according to an exemplary embodiment.

In an exemplary embodiment, the host system may be any system that can substantially cooperate with the memory storage device to store data. In the above-mentioned exemplary embodiment, although the host system is described as a computer system, FIG. 3 is a schematic view of a host system and a memory storage device according to another exemplary embodiment. Referring to FIG. 3, in another exemplary embodiment, a host system 31 may be a system such as a digital camera, a video camera, a communication device, an audio player, a video player or a tablet PC and so on. The memory storage device 30 may be various rewritable non-volatile memory storage devices such as an SD card 32, a CF card 33 or an embedded storage device 34 used therefor. The embedded storage device 34 is a variety of embedded storage devices including an embedded MMC (eMMC) card 341 and/or an embedded multi chip package (eMCP) storage device 342 that directly couple the memory module to the substrate of the host system.

Figure 4:
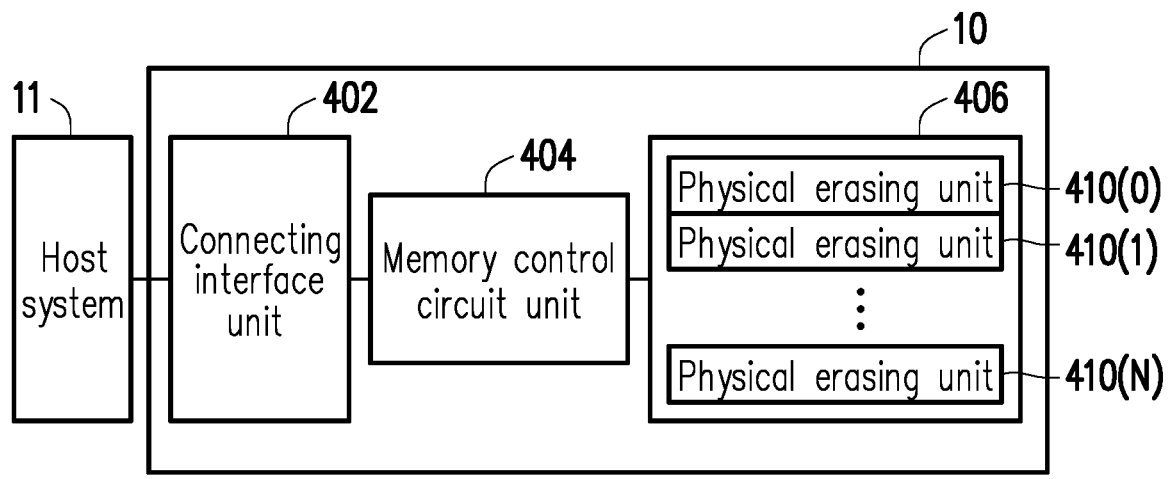
FIG. 4 is a schematic block view of a memory storage device according to an exemplary embodiment.

FIG. 4 is a schematic block view of a host system and a memory storage device according to an exemplary embodiment.

Referring to FIG. 4, the memory storage device 10 includes a connecting interface unit 402, a memory control circuit unit 404 and a rewritable non-volatile memory module 406.

In the exemplary embodiment, the connecting interface unit 402 is compatible with a Serial Advanced Technology Attachment (SATA) standard; however, it should be indicated that the invention provides no limitation thereto. The connecting interface unit 402 may also be a standard that meets the Parallel Advanced Technology Attachment (PATA) standard, the Institute of Electrical and Electronic Engineers (IEEE) 1394 standard, the Peripheral Component Interconnect Express (PCI Express) standard, the Universal Serial Bus (USB) standard, the Ultra High Speed-I (UHS-I) interface standard, the Ultra High Speed-II (UHS-II) interface standard, the Secure Digital (SD) interface standard, the Memory Stick (MS) interface standard, the Multi-Chip Package interface standard, the Multi-Media Card (MMC) interface standard, the Embedded Multimedia Card (eMMC) interface standard, the Universal Flash Storage (UFS) interface standard, the embedded Multi Chip Package (eMCP) interface standard, the Compact Flash (CF) interface standard, the Integrated Device Electronics (IDE) standard or other suitable standards. In the exemplary embodiment, the connecting interface unit 402 may be packed in one chip along with the memory control circuit unit 404, or the connecting interface unit 402 is arranged outside a chip that contains the memory control circuit unit.

The memory control circuit unit 404 performs a plurality of logic gates or control commands implemented in the form of hardware of firmware, and writes, reads and erases data in the rewritable non-volatile memory module 406 according to the command of the host system 11.

The rewritable non-volatile memory module 406 is coupled to the memory control circuit unit 404 for storing the data written by the host system 11. The rewritable non-volatile memory module 406 has physical erasing units 410(0)~410(N). For example, the physical erasing units 410(0)~410(N) may belong to the same memory die or different memory dice. Each of the physical erasing units respectively have a plurality of physical programming units, wherein the physical programming units that belong to the same physical erasing unit may be independently written and erased simultaneously; however, it should be indicated that the invention provides no limitation thereto. Each of the physical erasing units may be constituted by 64 physical programming units, 256 physical programming units or any number of physical programming units.

More specifically, the physical erasing unit is the minimum unit for erasing operation. That is, each of the physical erasing units has the least number of memory cell that is erased altogether. The physical programming unit is the minimum unit for programming operation. In other words, the physical programming unit is the minimum unit for writing data. Generally, each of the physical programming unit includes a data bit area and a redundancy bit area. The data bit area includes a plurality of physical access addresses for storing user's data, and the redundancy bit area is used for storing data of system (e.g., control information and error correcting code). In the exemplary embodiment, the data bit area of each of the physical programming units includes 8 physical access addresses, and the size of each of the physical access addresses is 512 byte. However, in other exemplary embodiment, the data bit area may include a more number or a less number of physical access addresses; the invention provides no limitation to the size and the number of the physical access address. For example, in an exemplary embodiment, the physical erasing unit is a physical block, and the physical programming unit is a physical page or a physical sector, which should not be construed as a limitation to the invention.

In the exemplary embodiment, the rewritable non-volatile memory module 406 is a trinary level cell (TCL) NAND flash memory module (i.e., a flash memory cell module that can store 3 data bits in one memory cell). However, the present invention is not limited thereto. The rewritable non-volatile memory module 406 may be a Multi Level Cell (MLC) NAND flash memory module (i.e., a flash memory module that can store two data bits in one memory cell), other flash memory module or other memory modules having the same characteristics.

Figures 5A, 5B:
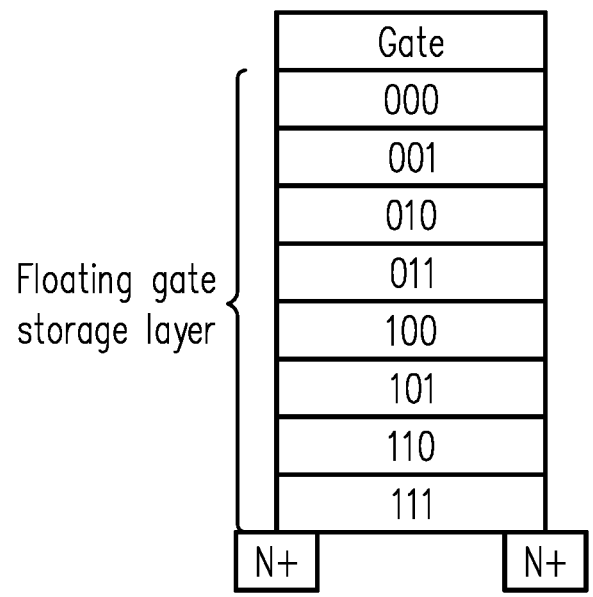
FIG. 5A and FIG. 5B are a schematic views of a memory cell storage structure and a physical erasing unit according to an exemplary embodiment.

FIG. 5A and FIG. 5B are a schematic views of a memory cell storage structure and a physical erasing unit according to an exemplary embodiment.

Referring to FIG. 5A, the storage status of each memory cell of the rewritable non-volatile memory module 406 may be identified as "111", "110", "101", "100", "011", "010", "001" or "000" (as shown in FIG. 5A), wherein the first bit counted from the left side is LSB, the second bit counted from the left side is CSB and the third bit counted from the left side is MSB. In addition, a plurality of memory cells arranged on the same word line may constitute three physical programming units, wherein the physical programming units constituted by LSB of the memory cells is called as a lower physical programming unit, the physical programming unit constituted by CSB of the memory cells is called a middle physical programming unit, and the physical programming unit constituted by MSB of the memory cells is called an upper physical programming unit.

Referring to FIG. 5B, one physical erasing unit is constituted by a plurality of the physical programming unit sets including the lower physical programing unit, the middle programming unit and the upper physical programming unit constituted by the plurality of memory cells arranged on the same word line. For example, in the physical erasing unit, the $0^{th}$ physical programming unit belonging to the lower physical programming unit, the $1^{st}$ physical programming unit belonging to the middle physical programming unit and the $2^{nd}$ physical programming unit belonging to the upper physical programming unit are regarded as one physical programming unit set. Similarly, the $3^{rd}$, the $4^{th}$ and the $5^{th}$ physical programming units are regarded as one physical programming unit set; likewise, other physical programming units are classified into a plurality of physical programming unit sets according to the same method. In other words, in the exemplary embodiment of FIG. 5B, the physical erasing unit has 258 physical programming units in total, and since the lower physical programming unit, the middle physical programing unit and the upper physical programming unit constituted by the plurality of memory cells arranged on the same word line constitute one physical programming unit set, the physical erasing unit in FIG. 5B may be classified into 86 physical programming unit sets in total. However, it should be indicated that the invention provides not limitation to the number of the physical programming unit or physical programming unit set in the physical erasing unit.

Figure 6:
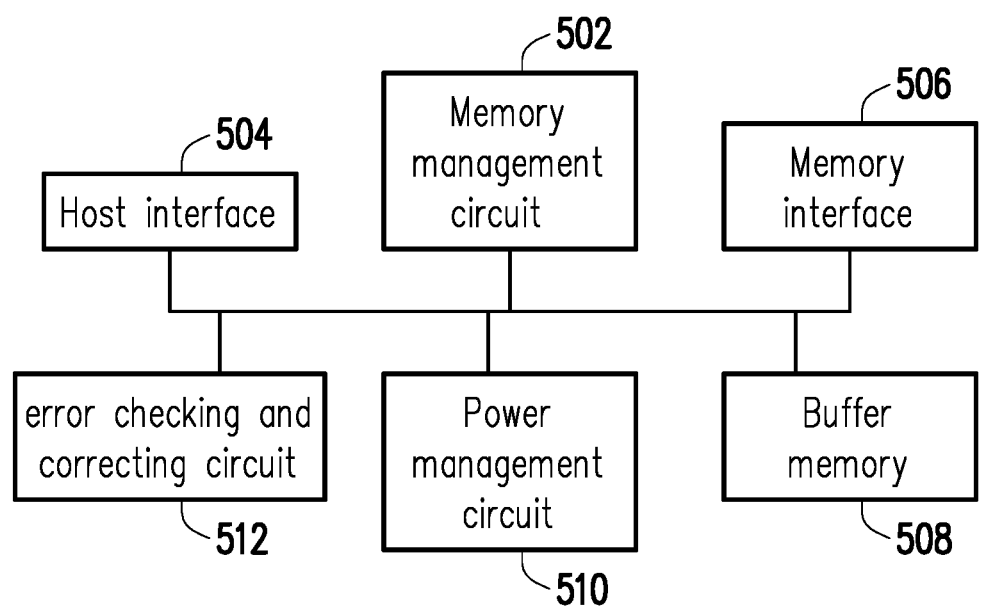
FIG. 6 is a schematic block view of a memory control circuit unit according to an exemplary embodiment.

FIG. 6 is a schematic block view of a memory control circuit unit according to an exemplary embodiment.

Referring to FIG. 6, the memory control circuit unit 404 includes a memory management circuit 502, a host interface 504 and a memory interface 506, a buffer memory 508, a power source management circuit 510 and an error checking and correcting circuit 512.

The memory management circuit 502 controls the overall operation of the memory control circuit unit 404. Specifically, the memory management circuit 502 has a plurality of control commands, and when the memory storage device 10 is operated, the control commands are executed to perform writing, reading and erasing operations on data. Operations of the memory management circuit 502 or circuit element included in the memory control circuit unit 404 are similar to the operations of the memory controlling circuit unit 404, thus related description is omitted hereinafter.

In the exemplary embodiment, the control commands of the memory management circuit 502 are implemented in the form of firmware. For example, the memory management circuit 502 has a microprocessor unit (not shown) and a read only memory (not shown), and the control commands are recorded into the read only memory. When the memory storage device 10 is operated, the control commands are executed by the microprocessor unit to perform writing, reading and erasing operations on data.

It is noted that in the following description, some terms may be replaced with corresponding abbreviations for ease of reading (see Table 1).

TABLE 1

| rewritable non-volatile memory module | RNVM module |
|---|---|
| physical programming unit | PPU |
| physical erasing unit | PEU |
| memory management circuit | MMC |
| logical-physical mapping table | L2P table |

Figure 7:
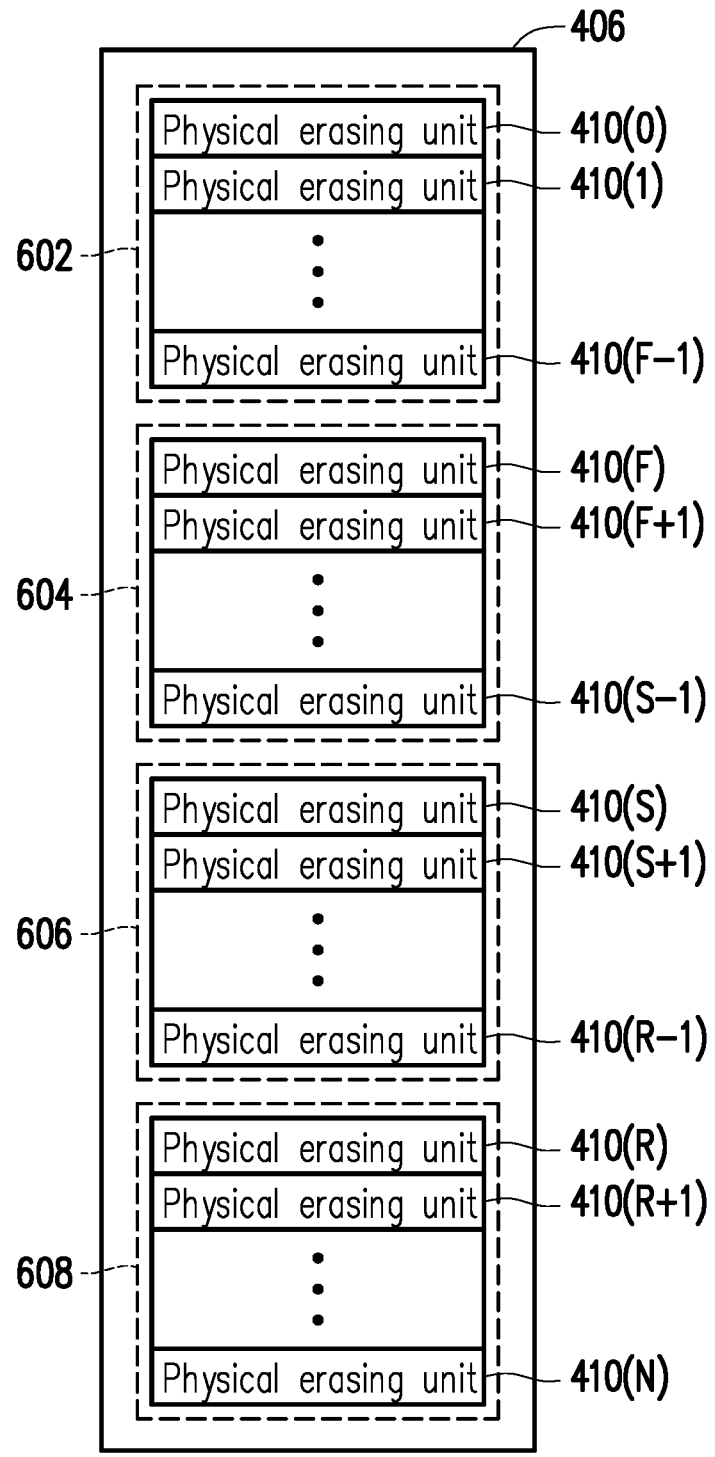
FIG. 7 and FIG. 8 are exemplary schematic views of a managing PEU according to an exemplary embodiment.
Figure 8:
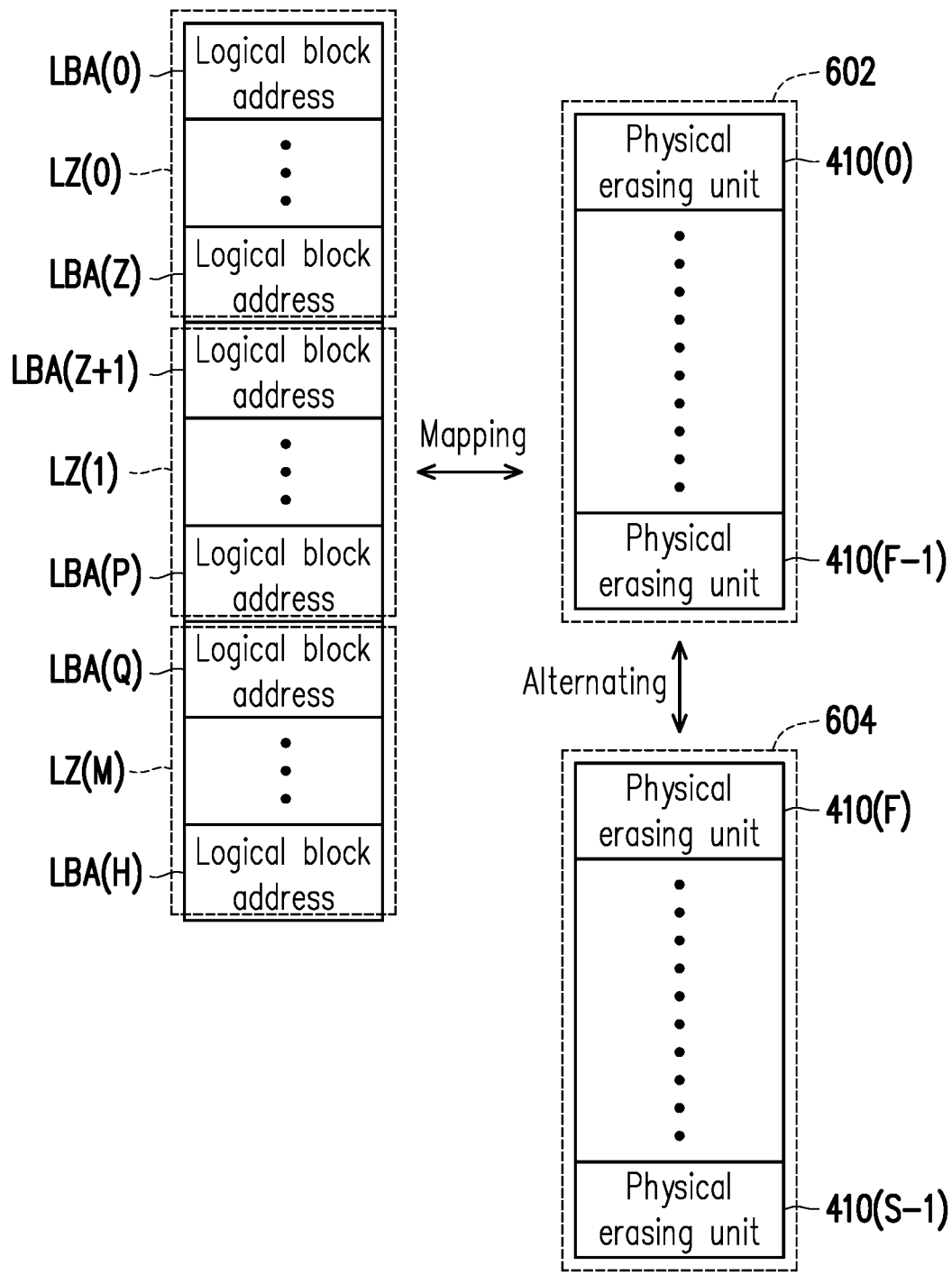

FIG. 7 and FIG. 8 are exemplary schematic views of a managing PEU according to an exemplary embodiment.

It should be understood that in description of the operations of the PEUs of the RNVM module 406, the terms "retrieve", "group", "divide" and "associate" and so on used for the PEUs are logical concepts. Namely, the PEUs of the RNVM module are operated logically, while actual locations of the PEUs of the RNVM module are not changed.

Referring to FIG. 7, the memory control circuit unit 404 (or MMC 502) logically groups the PEUs 410(0)~410(N) into a data area 602, a free area 604, a system area 606 and a replacement area 608.

The PEU that logically belongs to the data area 602 and the free area 604 stores the data from the host system 11. Specifically, the PEU of the data area 602 is regarded as the PEU in which the data is stored, and the PEU of the free area 604 is used to replace the PEU of the data area 602. In other words, when the host system 11 receives the write command and the data to be written, the memory control circuit unit 404 (or MMC 502) retrieves the PEU from the free area 604, and writes the data into the retrieved PEU to replace the PEU in the data area 602.

The PEU that logically belongs to the system area 606 records system data. For example, the system data includes the manufacturer and model number of the RNVM module, the number of the PEU in the RNVM module, the number of PEU of each of the PEUs and so on.

The PEU that logically belongs to the replacement area 608 is used in a bad PEU replacing process to replace the damaged PEU. Specifically, if there is still normal PEU in the replacement area 608 and the PEU in the data area 602 is damaged, the memory control circuit unit 404 (or MMC 502) retrieves the normal PEU from the replacement area 608 to replace the damaged PEU.

In particular, the number of the PEU in the data area 602, the free area 604, the system area 606 and the replacement area 608 varies according to the specification of different memories. In addition, it should be indicated that, in the operation of the memory storage device 10, the grouping relationship in which the PEU is associated to the data area 602, the free area 604, the system area 606 and the replacement area 608 is changed dynamically. For example, when the PEU in the free area 604 is damaged and replaced by the PEU in the replacement area 608, the PEU which is originally in the replacement area 608 is associated to the free area 604.

Referring to FIG. 8, the memory control circuit unit 404 (or MMC 502) is provided with logical block addresses LBA(0)~LBA(H) to map the PEU in the data area 602, wherein each of the logical block addresses has a plurality of logical addresses to map the PPU corresponding to the PEU. Meanwhile, when the host system 11 is to write data to the logical address or updates the data stored in the logical address, the memory control circuit unit 404 (or MMC 502) retrieves a PEU from the free area 604 as an actuating PEU to write data, so as to alternate the PEU in the data area 602. Moreover, when the PEU serving as actuating PEU is fully written with data, the MMC 502 retrieves an empty PEU as an actuating PEU from the free area 604, so as to continuously write updated data corresponding to the write command from the host system 1000. In addition, when the number of the usable PEU in the free area 604 is smaller than a predetermined value, the MMC 502 performs garbage collection operation (also referred to as valid data combining operation) to trim the valid data in the data area 602, so as to re-associate the PEU in which no valid data is stored in the data area 602 to the free area 604.

In order to identify which PEU in which the data of each of the logical addresses is stored, in the exemplary embodiment, the memory control circuit unit 404 (or the MMC 502) records mapping relationship between the logical address and the PPU. For example, in the exemplary embodiment, the memory control circuit unit 404 (or the MMC 502) stores a L2P table in the RNVM module 406 to record the PPU mapped by each of the logical addresses, and when the data is to be accessed, the memory control circuit unit 404 (or the MMC 502) loads the L2P table into the buffer memory 508 for maintenance, and write or read data according to the L2P table.

It should be mentioned that, since the capacity of the buffer memory 508 is limited and cannot store the mapping table that records the mapping relationship of all the logical addresses, in the exemplary embodiment, the memory control circuit unit 404 (or MMC 502) groups the logical block addresses LBA(0)~LBA(H) into a plurality of logical areas LZ(0)~LZ(M), and each of the logical areas is provided with a L2P table. Specifically, when the memory control circuit unit 404 (or the MMC 502) is to update the mapping of a particular logical block address, the L2P table that corresponds to the logical area to which the logical unit belongs is loaded into the buffer memory 508 to be updated. Specifically, if the L2P table corresponding to the logical area to which the logical block address belongs is not temporarily stored in the buffer memory 508 (i.e., the L2P table temporarily stored in the buffer memory 508 does not record the mapping of the logical block address to be updated, the memory control circuit unit 404 (or MMC 502) performs mapping table swapping operation to restore the L2P table temporarily stored in the buffer memory 508 in the RNVM module 406, and loads the L2P table recorded with and mapped by the logical block address to be updated into the buffer memory 508.

In another exemplary embodiment of the invention, the control commands of the MMC 502 may be stored in a specific area (e.g., a system area in the memory module that is exclusively used for storing system data) of the RNVM module 406 in the form of program code. In addition, the MMC 502 has a microprocessor unit (not shown), a read only memory (not shown) and a random access memory (not shown). In particular, the read only memory has a boot code, and when the memory control circuit unit 404 is enabled, the microprocessor unit executes the boot code first to load the control command stored in the RNVM module 406 into the RAM of the MMC 502. Thereafter, the microprocessor unit runs the control commands to perform writing, reading and erasing operations on data.

In addition, in another exemplary embodiment of the invention, the control commands of the MMC 502 may be implemented in the form of hardware. For example, the MMC 502 includes a micro-controller, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the micro-controller. Specifically, the memory cell management circuit manages the PEU of the RNVM module 406; the memory writing circuit gives a write command to the RNVM module 406 to write the data into the RNVM module 406; the memory reading circuit gives a read command to the RNVM module 406 to read data from the RNVM module 406; the memory erasing circuit gives an erase command to the RNVM module 406 to erase the data from the RNVM module 406; and the data processing circuit processes the data to be written into the RNVM module 406 and reads data from the RNVM module 406.

Referring to FIG. 6, the host interface 504 is coupled to the MMC 502 and also coupled to the connecting interface unit 402 to receive and identify the command and data transmitted by the host system 11. In other words, the command and data transmitted by the host system 11 are transmitted to the MMC 502 via the host interface 504. In the exemplary embodiment, the host interface 504 meets the SATA standard. However, it should be understood that the present invention provides no limitation thereto. The host interface 504 may also meet the PATA standard, the IEEE 1394 standard, the PCI Express standard, the USB standard, the UHS-I interface standard, the UHS-II interface standard, the SD standard, the MS standard, the MMC standard, the CF standard, the IDE standard or other suitable data transmitting standard.

The memory interface 506 is coupled to the MMC 502 and accesses the RNVM module 406. In other words, the data that is to be written into the RNVM module 406 is converted by the memory interface 506 into a format that can be accepted by the RNVM module 406.

The buffer memory 508 is coupled to the MMC 502 and stores the data and command from the host system 11 temporarily or the data from the RNVM module 406.

The power management circuit 510 is coupled to the MMC 502 and controls the power of the memory storage device 10.

The error checking and correcting circuit 512 is coupled to the MMC 502 and performs an error checking and correcting process to ensure accuracy of the data. For example, when the MMC 502 receives a write command from the host system 11, the error checking and correcting circuit 512 generates a corresponding error checking and correcting code (ECC code) corresponding to the data of the write command, and the MMC 502 writes the data corresponding to the write command and the corresponding error checking and correcting code into the RNVM module 406. Thereafter, when reading the data from the RNVM module 406, the MMC 502 also reads the error checking and correcting code corresponding to the data, and the error checking and correcting circuit 512 performs the error checking and correcting process on the read data according to the error checking and correcting code.

It should be mentioned that, in the exemplary embodiment, the memory control circuit unit 404 (or MMC 502) programs data to the RNVM module 406 using different programming modes under different states. For example, the memory control circuit unit 404 (or MMC 502) may use a single page programming mode or a multi-page programming mode to program the data to the PEU. Here, the programming speed for programming memory cell based on the single page programming mode is faster than the programming speed for programming memory cell based on the multi-page programming mode (i.e., the operation time required for programming data using multi-page programming mode is longer than the operation time required for programming data using single page programming mode). The reliability of data that is stored based on single page programming mode is usually higher than the reliability of data that is stored based on the multi-page programming mode. The single page programming mode is one of, for example, single layer memory cell (SLC) programming mode, lower physical programming mode, mixture programming mode, and less layer memory cell programming mode. More specifically, under the SLC mode, one memory cell only stores data of one bit. Under the lower physical programming mode, only the lower PPU is programmed, and the upper PPU corresponding to the lower PPU may not be programmed. Under the mixture programming mode, the valid data (or authentic data) is programmed into the lower PPU, and dummy data is programmed at the same time into the upper PPU corresponding to the lower PPU in which the valid data is stored. Under the less layer memory cell programming mode, one memory cell stores data of a first number of bit. For example, the first number may be set as "1". The multi-page programming mode is, for example, multi-level memory cell (MLC) programming mode, triple level cell (TLC) programming mode or the like. Under multi-page programming mode, one memory cell stores data of a second number of bit, wherein the second number is equal than or larger than "2". For example, the second number may be set as 2 or 3. In another exemplary embodiment, the first number in the single page programming mode and the second number in the multi-page programming mode may be other number as long as the second number is larger than the first number. In other words, the number (i.e., first number) of bit data stored in each of the memory cells that constitutes the first type of PEU after being programmed using the single page programming mode is smaller than the number (i.e., second number) of bit data stored in each of the memory cells that constitutes the second type of PEU after being programmed using the multi-page programming mode.

Based on the above, the number of data bit stored in the memory cell programmed by using multi-page programming mode is larger than the number of data bit stored in the memory cell programmed by using the single page programming mode. Therefore, the capacity of the data of the PEU programmed by using the multi-page programming mode is larger than that programmed by using the single page programming mode. For example, in the exemplary embodiment, when the amount of data stored in the RNVM module 406 is smaller, the memory control circuit unit 404 (or MMC 502) uses the single page programming mode to shorten the time required for performing programming operation (i.e., improve programming speed). When the amount of data stored in the RNVM module 406 exceeds the predetermined value, the memory control circuit unit 404 (or MMC 502) uses the multi-page programming mode to write data instead.

FIG. 9-FIG. 17 are examples of writing data according to an exemplary embodiment. In the exemplary embodiment, data is programmed to the PEU using multi-page programming mode, that is, each of the PPUs is used for storing data.

Figure 9:
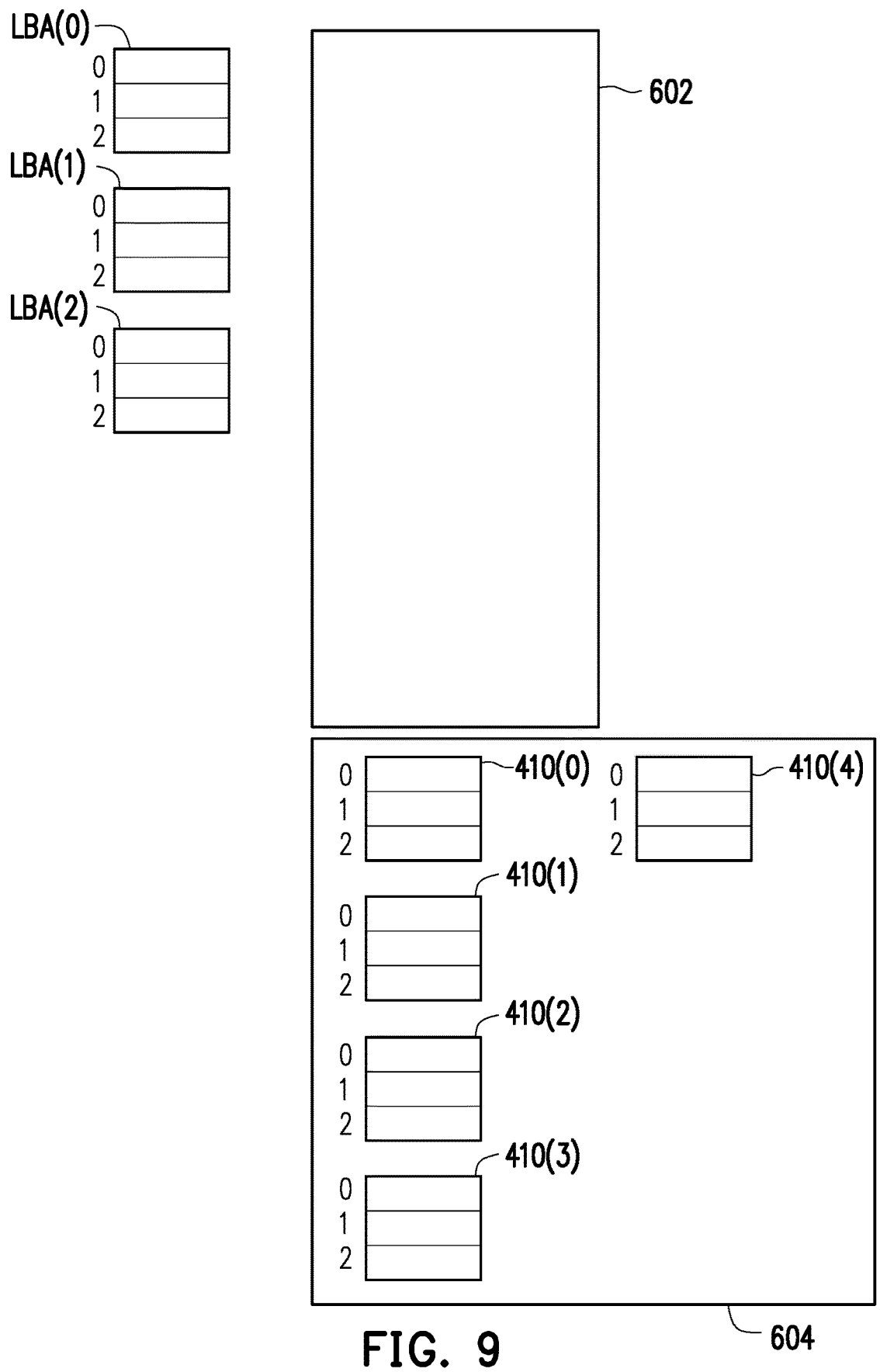
FIG. 9-FIG. 17 are examples of writing data according to an exemplary embodiment.

Referring to FIG. 9, for ease of description, it is assumed that the data area 602 initially has no PEU that maps logical block address (i.e., memory storage device 10 has not been written with user's data since being initialized). The free area 604 has five PEUs, each of the PEUs has three PPUs, the data that is to be written to each of the PEUs must be written according to the sequence of the PPU. Additionally, it is assumed that the MMC 502 is provided with three logical block address to be accessed by the host system 1000.

Figure 10:
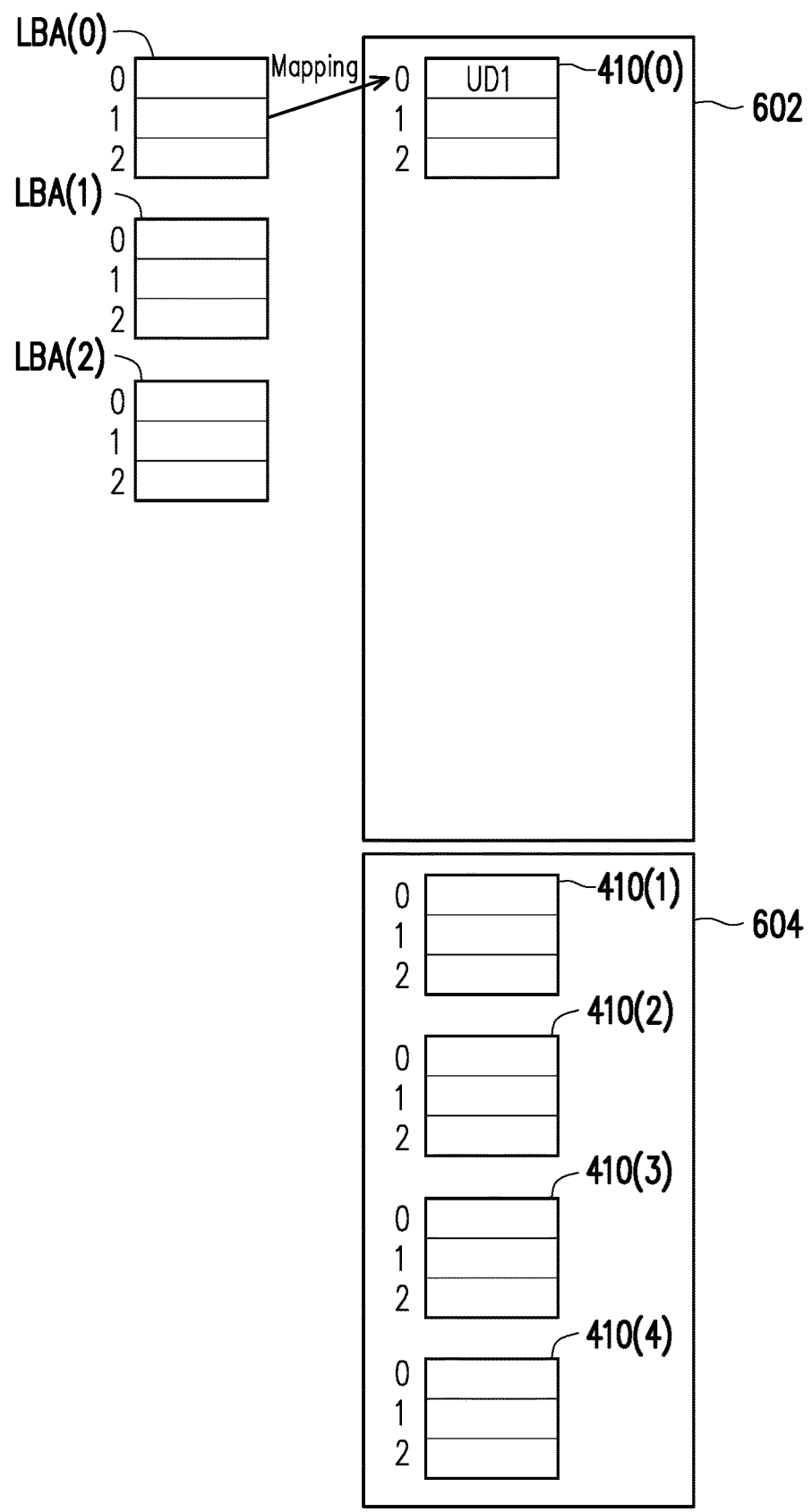

Referring to FIG. 10, it is assumed that when data UD1 is to be programmed and the data UD1 belongs to a $1^{st}$ logical address of the logical block address LBA(0), the MMC 502 retrieves a PEU 410(0) from the free area 604, gives a program command to write the data UD1 to the $0^{th}$ PPU of the PEU 410 (0). Additionally, the MMC 502 maps the $1^{st}$ logical address of the logical block address LBA(0) in the L2P table to the $0^{th}$ PPU of the PEU 410(0) (i.e., PEU 410(0) is associated to the data area 602).

Figure 11:
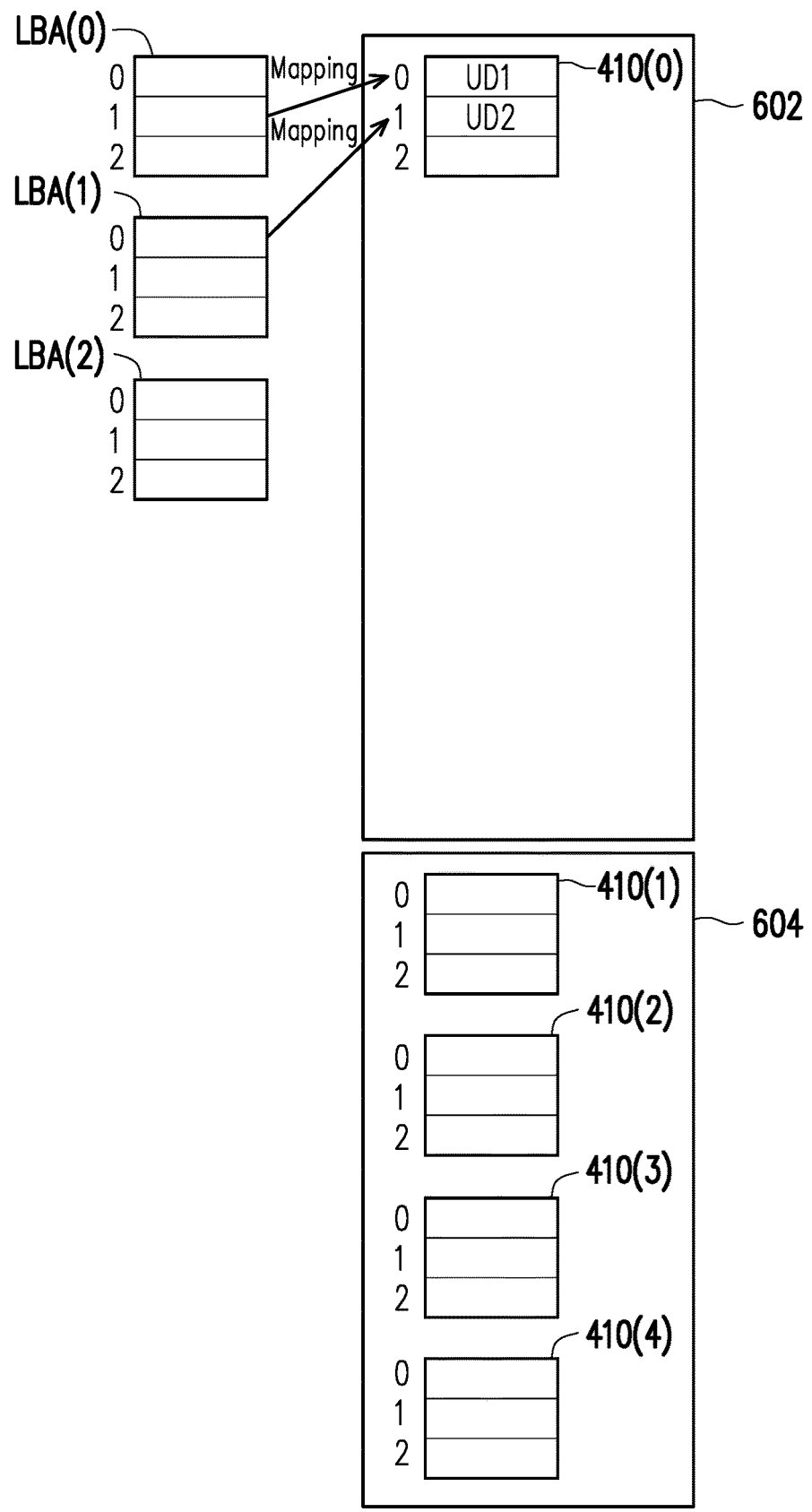

Referring to FIG. 11, in continuation with FIG. 10, it is assumed that data UD2 is also to be programmed and the data UD2 belongs to the $0^{th}$ logical address of the logical block address LBA(1), the MMC 502 gives a program command to write the data UD2 to the $1^{st}$ PPU of the PEU 410(0). Additionally, the MMC 502 maps the $0^{th}$ logical address of the logical block address LBA(1) in the L2P table to the $1^{st}$ PPU of the PEU 410(0).

Figure 12:
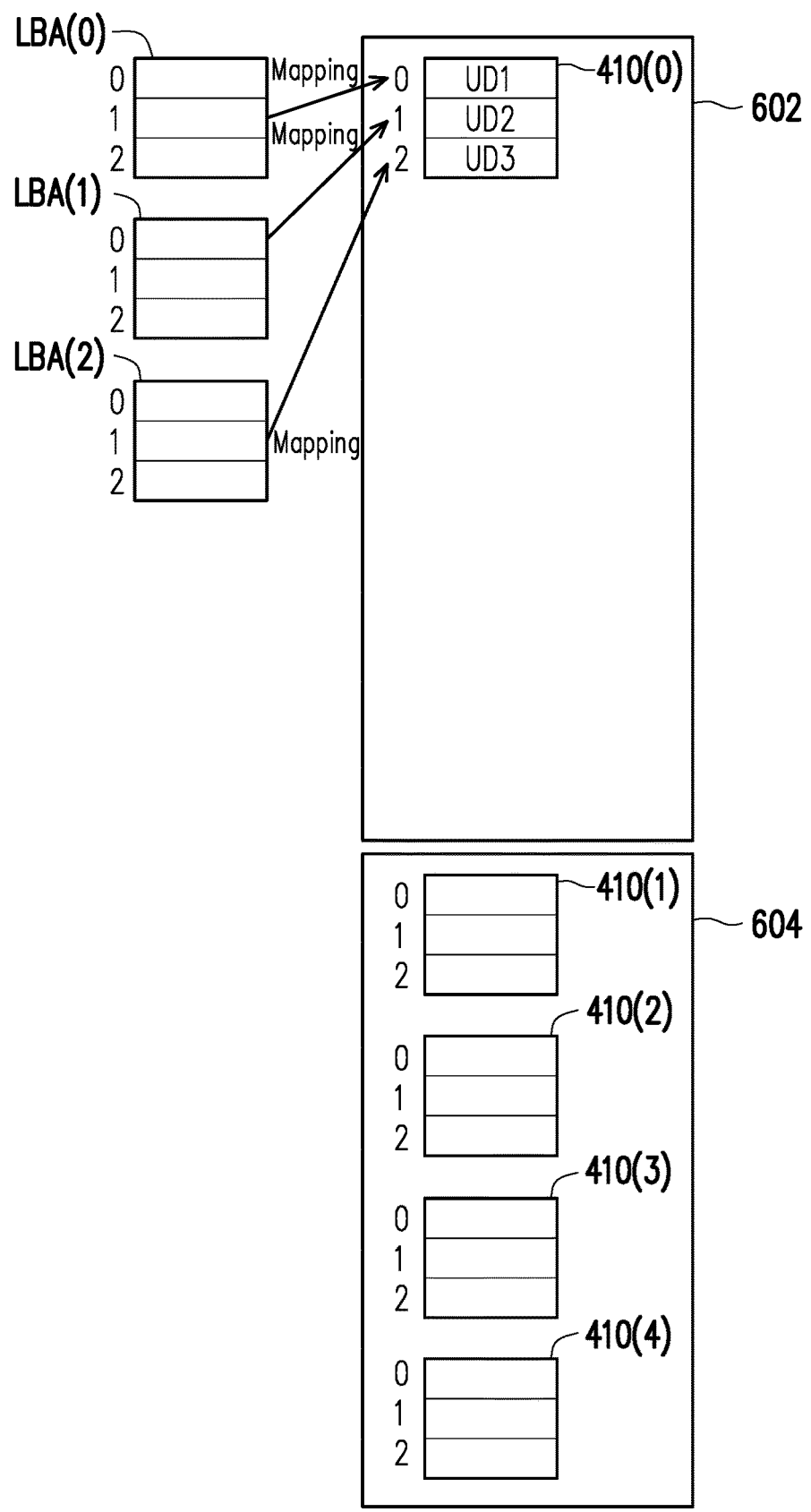

Referring to FIG. 12, in continuation with FIG. 11, it is assumed that data UD3 is also to be programmed and the data UD3 belongs to the $1^{st}$ logical address of the logical block address LBA(2), the MMC 502 gives the program command to write the data UD3 to the $2^{nd}$ PPU of the PEU 410(0). Moreover, the MMC 502 maps the $1^{st}$ logical address of the logical block address LBA(2) in the L2P table to the $2^{nd}$ PPU of the PEU 410(0).

Figure 13:
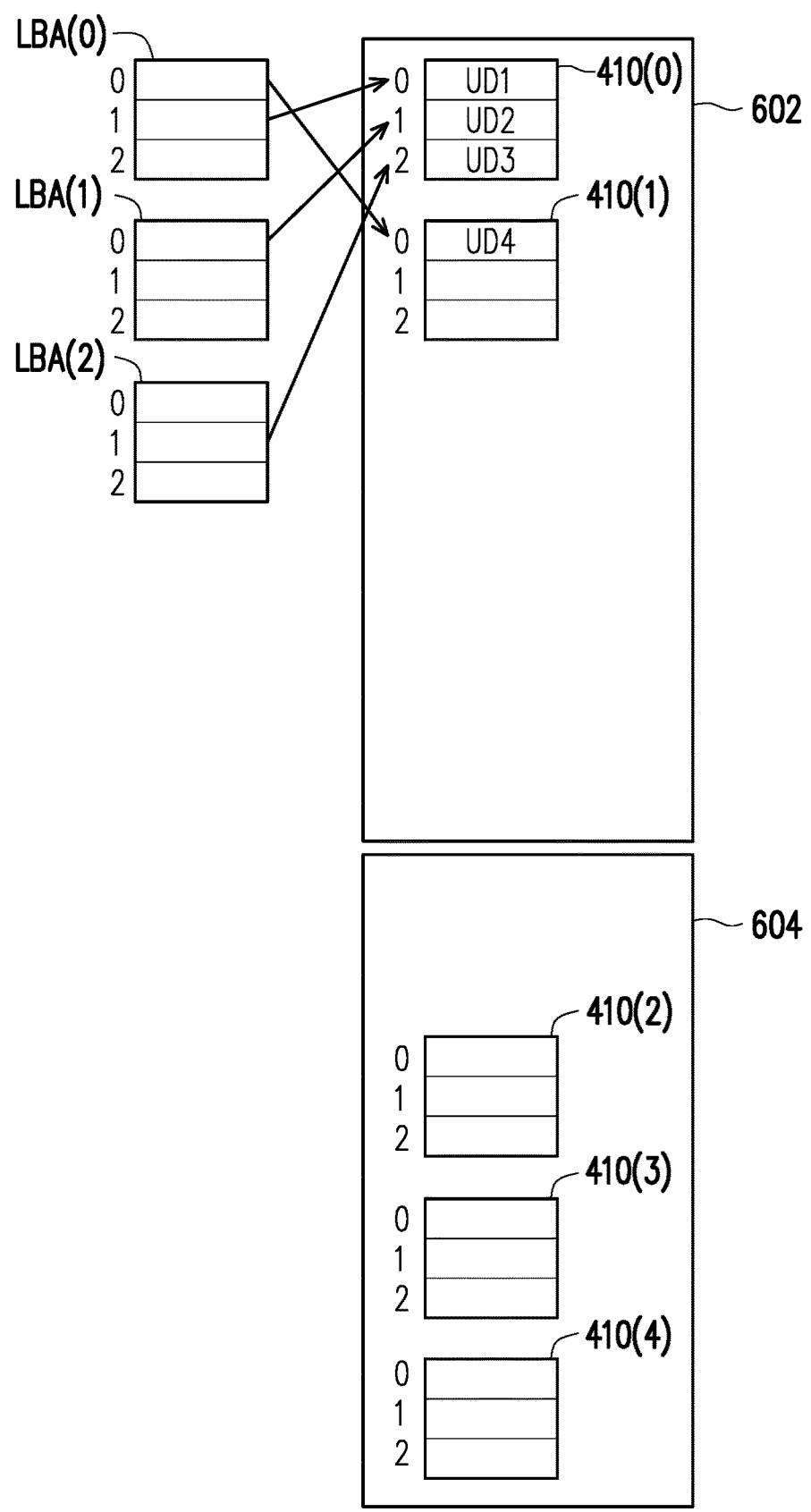

Referring to FIG. 13, in continuation with FIG. 12, it is assumed that data UD4 is also to be programmed and the data UD4 belongs to the $0^{th}$ logical address of the logical block address LBA(0), since the PEU 410(0) has no more space for storage, the MMC 502 retrieves the PEU 410(1) from the free area 604, and gives the program command to write the data UD4 to the $0^{th}$ PPU of the PEU 410(1) and associate the PEU 410(1) to the data area 602. Additionally, the MMC 502 maps the $0^{th}$ logical address of the logical block address LBA(0) in the L2P table to the $0^{th}$ PPU of the PEU 410(1) (i.e., the PEU 410(1) is associated to the data area 602).

Figure 14:
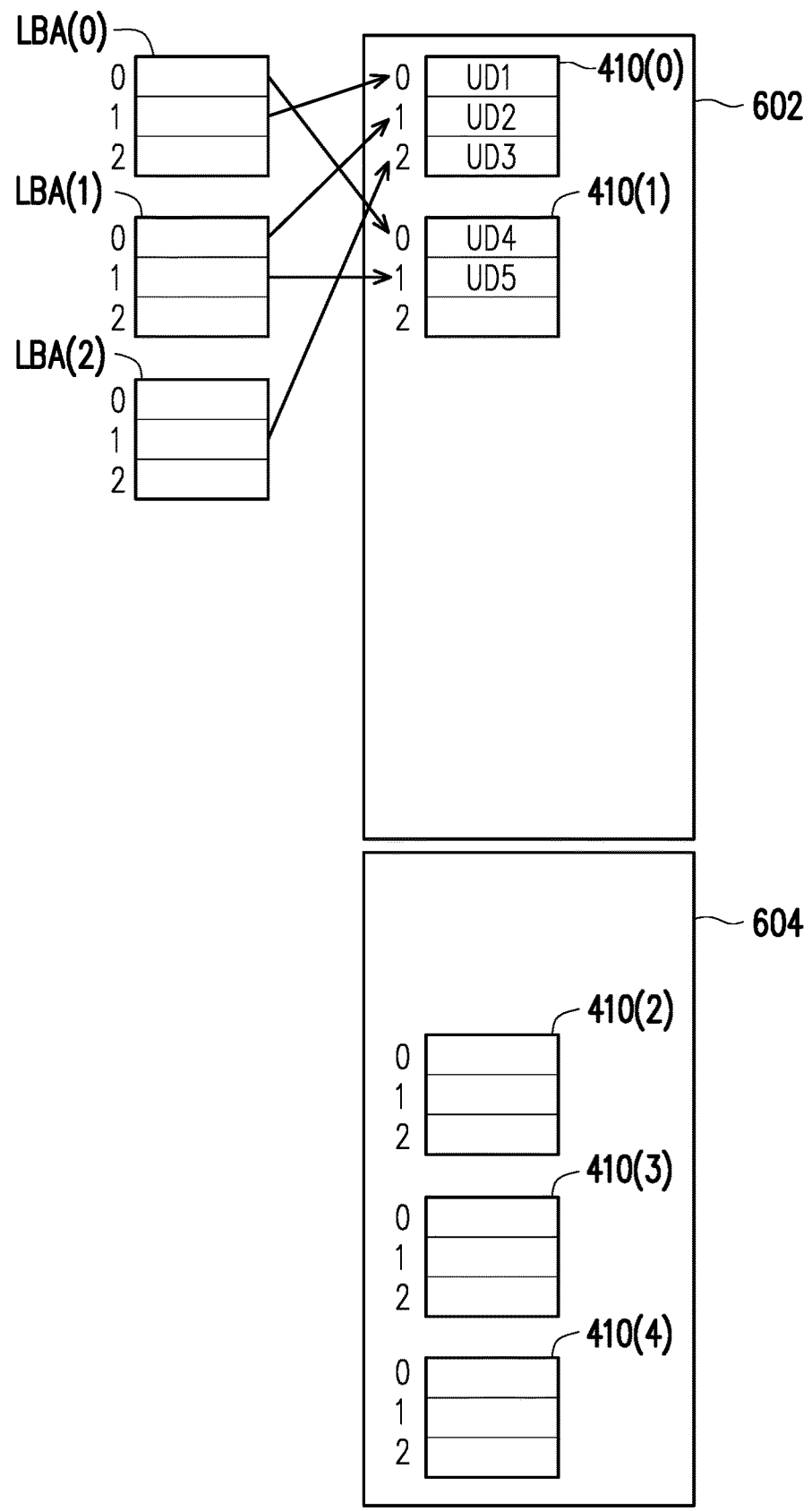

Referring to FIG. 14, in continuation with FIG. 13, it is assumed that data UD5 is also to be programmed and the data UD5 belongs to the $1^{st}$ logical address of the logical block address LBA(1), the MMC 502 gives the program command to write the data UD5 to the $1^{st}$ PPU of the PEU 410(1). Additionally, the MMC 502 maps the $1^{st}$ logical address of the logical block address LBA(1) in the L2P table to the $1^{st}$ PPU of the PEU 410(1).

Figure 15:
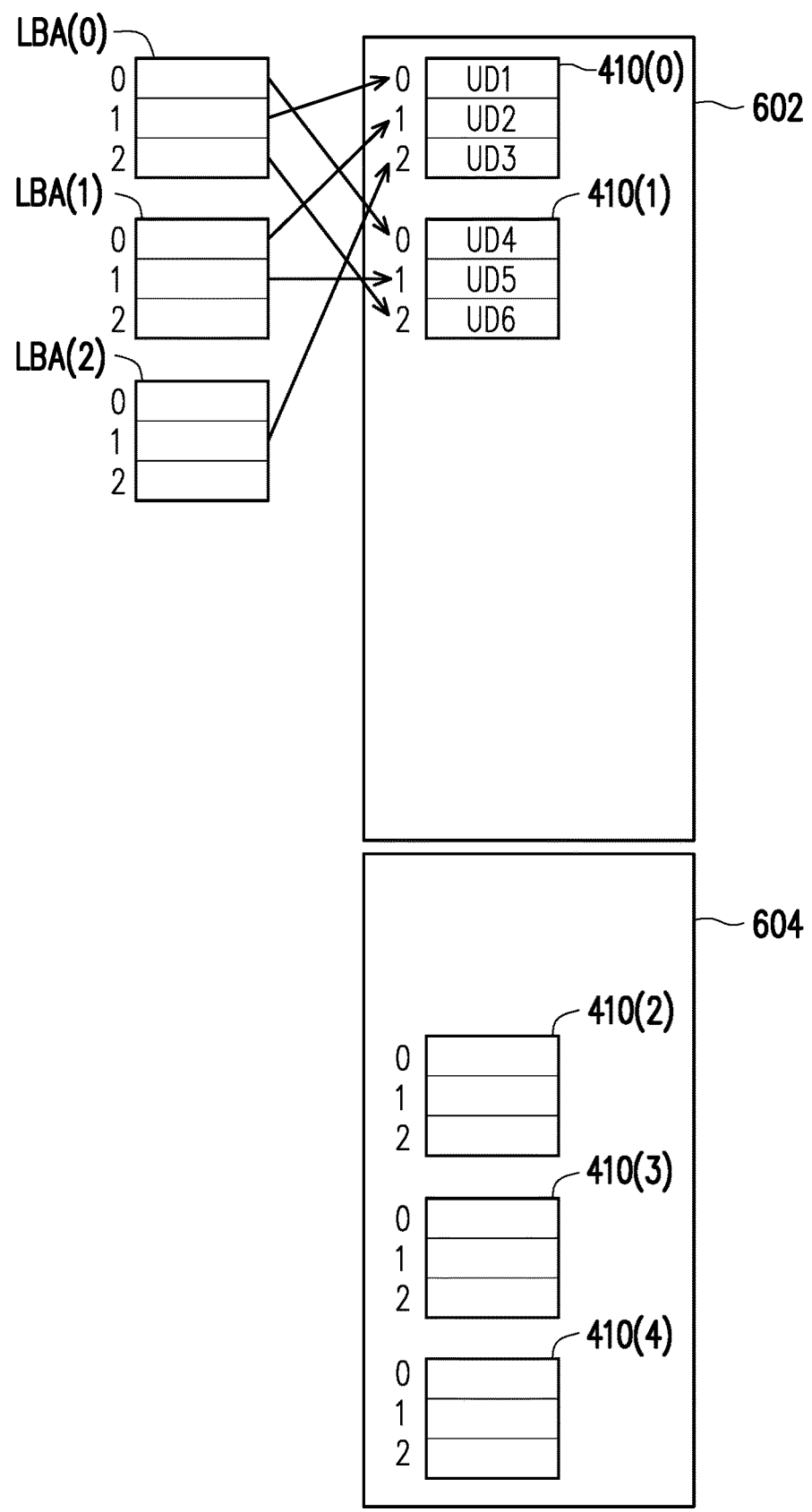

Referring to FIG. 15, in continuation with FIG. 14, it is assumed that data UD6 is also to be programmed and the data UD6 belongs to the $2^{nd}$ logical address of the logical block address LBA(0), the MMC 502 gives a program command to write the data UD6 to the $2^{nd}$ PPU of the PEU 410(1). Additionally, the MMC 502 maps the $2^{nd}$ logical address of the logical block address LBA(0) in the L2P table to the $2^{nd}$ PPU of the PEU 410(1).

Figure 16:
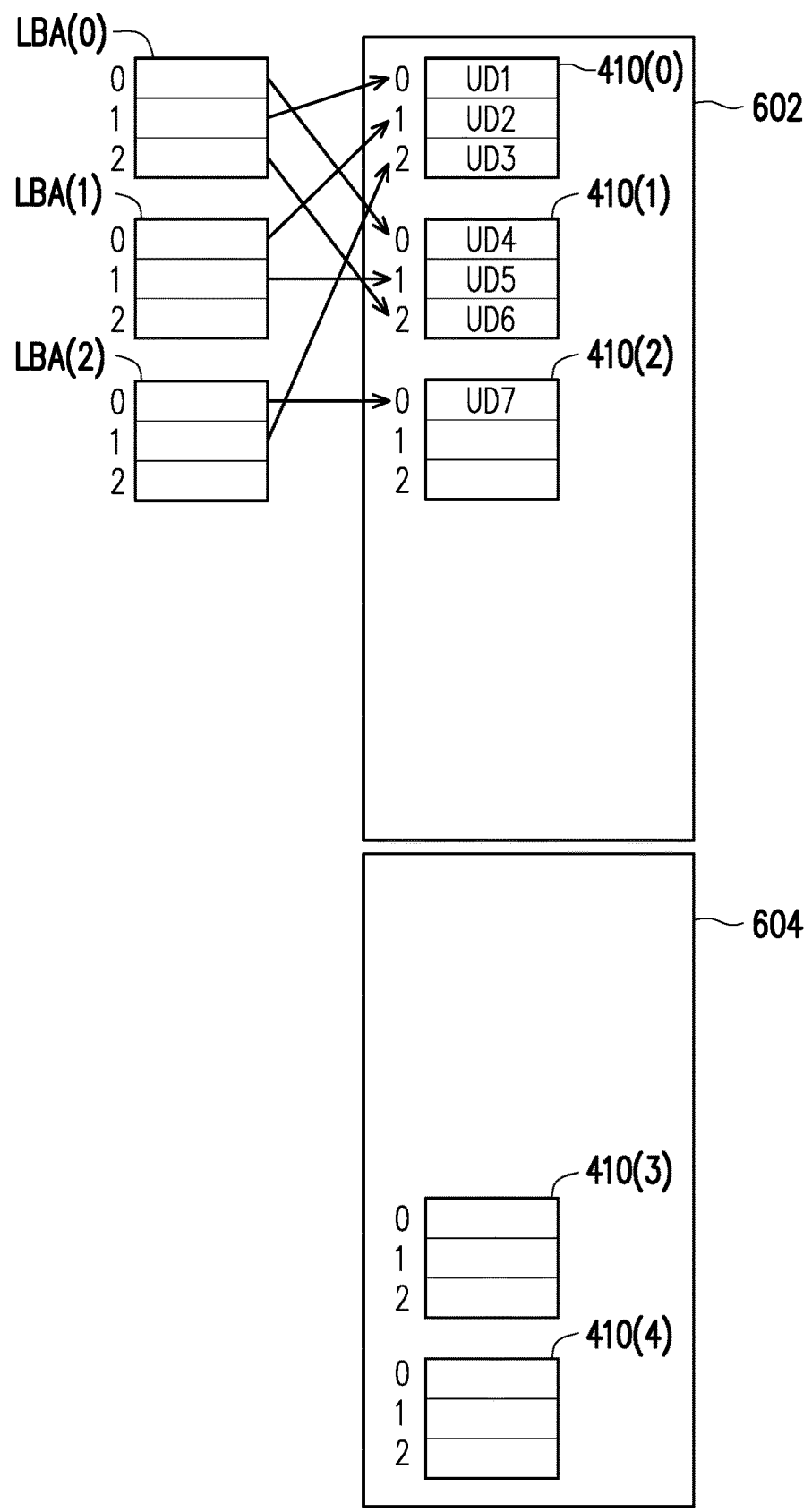

Referring to FIG. 16, in continuation with FIG. 15, it is assumed that data UD7 is also to be programmed and the data UD7 belongs to the $0^{th}$ logical address of the logical block address LBA(2), since the PEU 410(1) has no more space for storage, the MMC 502 retrieves the PEU 410(2) from the free area 604, and gives the program command to write the data UD7 to the e PPU of the PEU 410(2) and associate the PEU 410(2) to the data area 602. Additionally, the MMC 502 maps the $0^{th}$ logical address of the logical block address LBA(2) in the L2P table to the $0^{th}$ PPU of the PEU 410(2) (i.e., the PEU 410(2) is associated to the data area 602).

Figure 17:
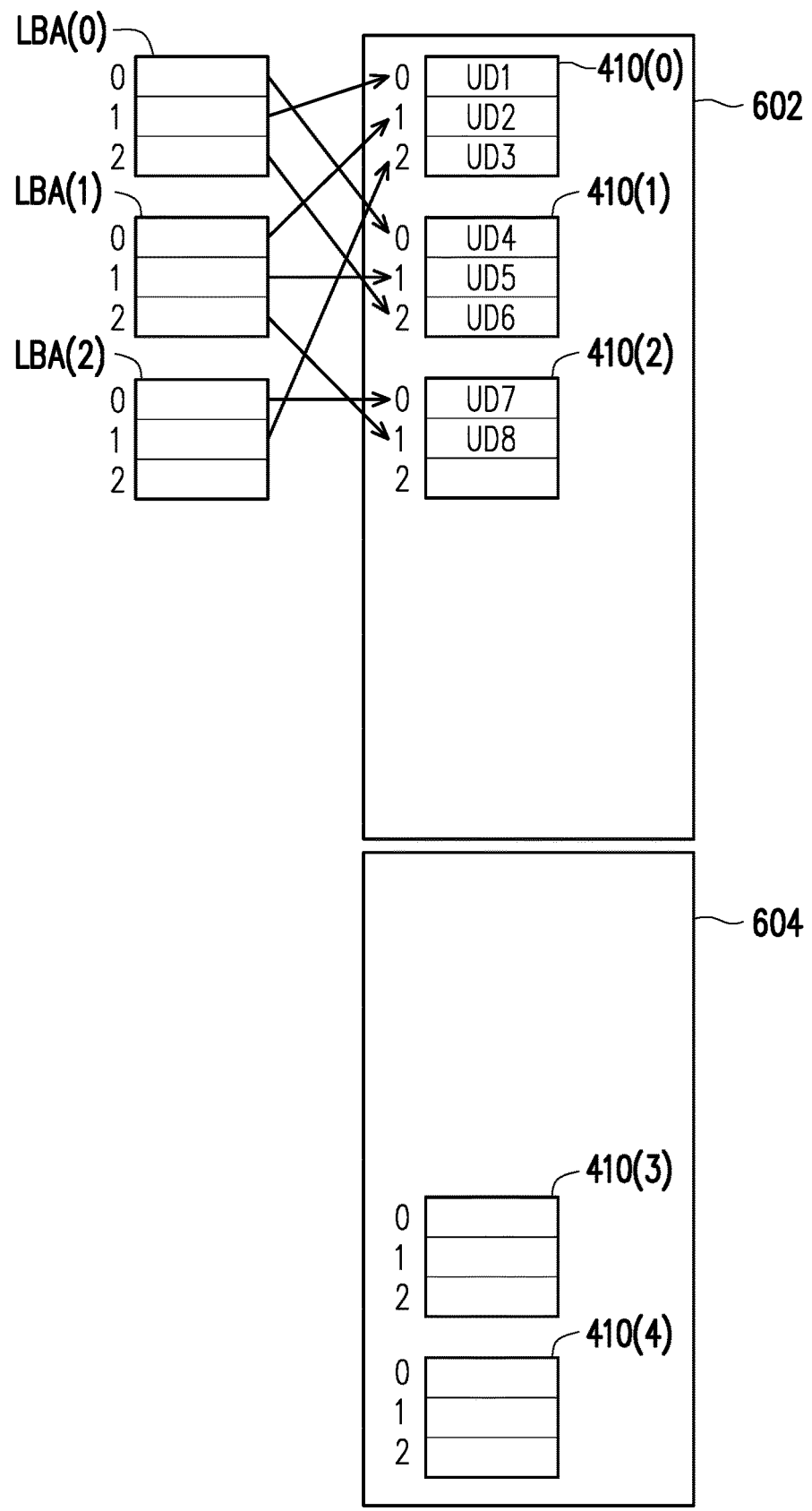

Referring to FIG. 17, in continuation with FIG. 16, it is assumed that data UD8 is also to be programmed and the data UD8 belongs to the $2^{nd}$ logical address of the logical block address LBA(1), the MMC 502 gives a program command to write the data UD8 to the $1^{st}$ PPU (also referred to as first PPU) of the PEU 410(2) (also referred to as first PEU). Additionally, the MMC 502 maps the $2^{nd}$ logical address of the logical block address LBA(1) in the L2P table to the $1^{st}$ PPU of the PEU 410(2).

It should be indicated that, in the exemplary embodiment, the MMC 502 determines whether to receive trim command from the host system 11. Here, the trim command refers to command that notifies which logical address on which the data is no longer in use or has been deleted. For example, the trim command may be referred to as a delete command, a remove command or other command having the same function. In particular, when it is determined that the trim command is received, the MMC 502 records information (e.g., logical address on which data has been deleted) regarding the trim command in the trim table, and sends a confirming message to the host system 11 to respond to the trim command, thereby quickly responding to the host system 11 to avoid delay or overtime.

Figure 18:
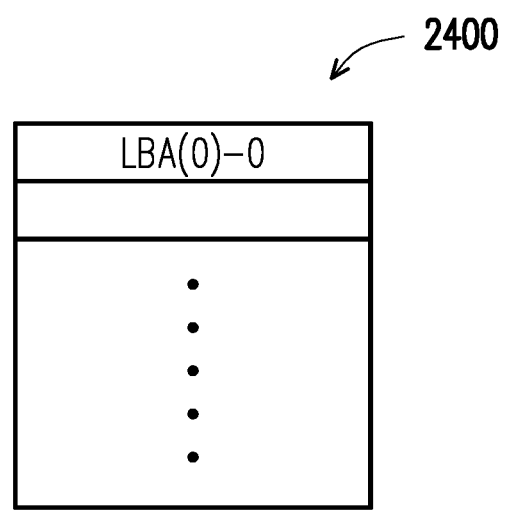
FIG. 18 is a schematic view of a trim table according to an exemplary embodiment.

FIG. 18 is a schematic view of a trim table according to an exemplary embodiment.

Referring to FIG. 18, assuming that, in the state of FIG. 17, the memory storage device 10 receives the trim command and the trim command notifies that the data on the $0^{th}$ logical address (also referred to as first logical address) of the logical block address LBA(0) has been deleted, the MMC 502 records the $0^{th}$ logical address (e.g., LBA(0)-0) of the logical block address LBA(0) in a trim table 2400. In particular, after the information regarding the trim command is recorded in the trim table 2400, the MMC 502 sends a confirming message to the host system 11 to represent that the trim command has been processed.

Thereafter, the MMC 502 activates the trimming operation at an appropriate timing to perform corresponding operation of the trim command recorded in the trim table. For example, the MMC 502 activates the trimming operation to change the mapping of indicated logical address in the L2P table into null according to the logical address indicated by the trim command, thereby representing that there is no valid data on the PPU originally mapped by the logical address.

However, it should be indicated that, in the exemplary embodiment, the trim table 2400 is stored in the buffer memory 508. If the abnormal power-off event is occurred before the memory storage device 10 actives trimming operation according to the trim table 2400, the information stored in the trim table 2400 is also lost. Therefore, when the memory storage device 10 is power-on, the MMC 502 is not capable of performing the trimming operation according to the trim table 2400, causing that the data (i.e., data UD4) that should be deleted originally from the $0^{th}$ logical address of the logical block address LBA(0) is still retained in the $1^{st}$ PPU of the PEU 410(1), and the MMC 502 is not capable of changing the mapping information in the L2P table according to the trim table 2400.

Figure 19:
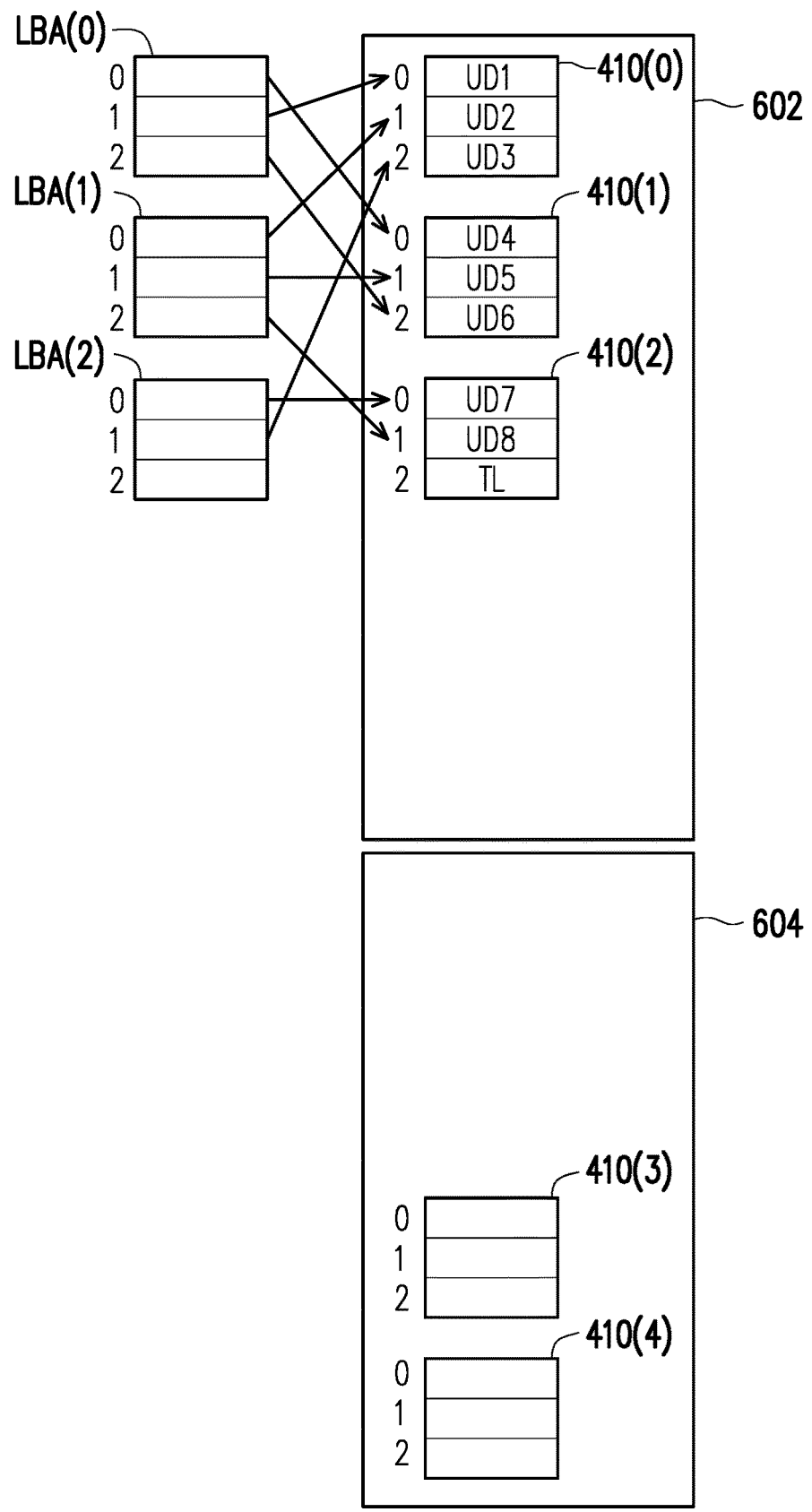
FIG. 19 is a schematic view of writing a trim command record corresponding to a trim command to a physical programming unit according to an exemplary embodiment.

Therefore, FIG. 19 is a schematic view of writing a trim command record corresponding to a trim command to a PPU according to an exemplary embodiment.

Referring to FIG. 19, in the exemplary embodiment, when the MMC 502 receives trim command from the host system and the trim command notifies that the data on the $0^{th}$ logical address of the logical block address LBA(0) has been deleted, the MMC 502 writes a trim command record TL corresponding to the trim command to the $2^{nd}$ PPU (also referred to as second PPU) of the PEU 410(2) that is currently used for writing operation. Specifically, the trim command record TL is used for storing information regarding that the data on the $0^{th}$ logical address of the logical block address LBA(0) has been deleted. Additionally, in an embodiment, the trim command record TL further includes a mapping relationship between the logical address and physical address when the trim command is being received.

Thereafter, it is assumed that abnormal power-off event is occurred to the memory storage device 10 before performing the trimming operation according to the trim table 2400. When the memory storage device 10 is power-on, since the trim command record TL is stored in the non-volatile memory, the trim command record TL is not lost due to the abnormal power-off event occurred to the memory storage device 10. Therefore, when the memory storage device 10 is power-on after the power-off event, the MMC 502 restores mapping information in the L2P table according to the trim command record TL stored in the $2^{nd}$ PPU of the PEU 410(2).

Figure 20:
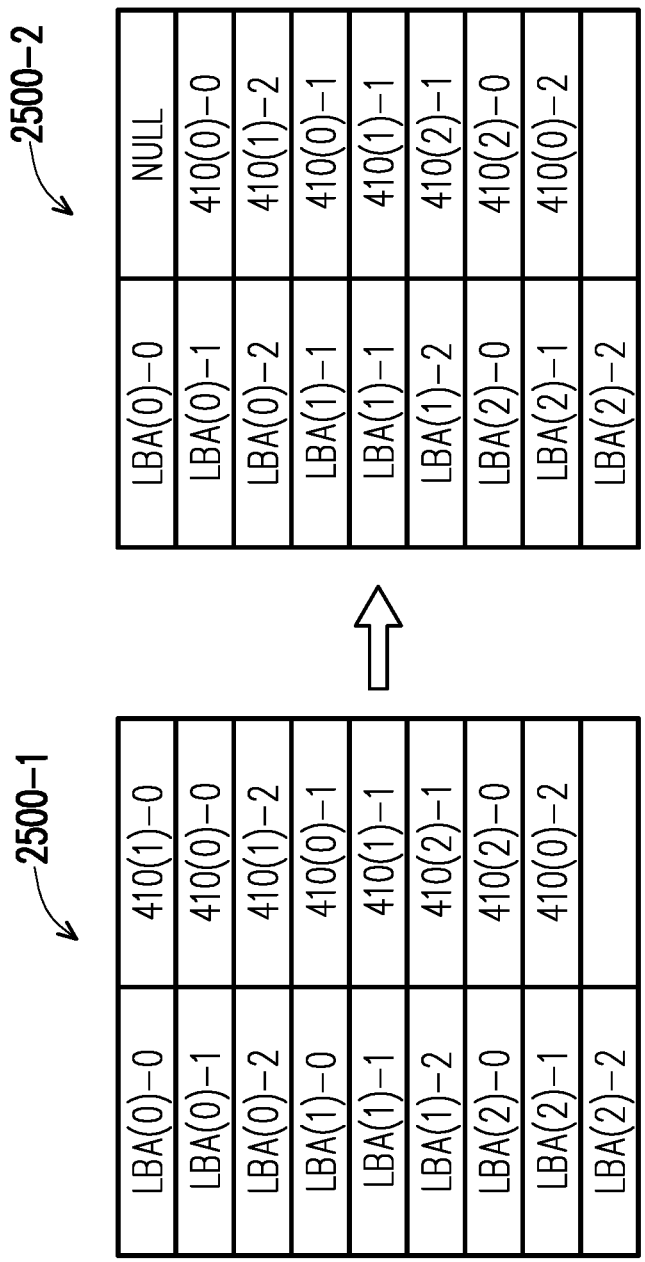
FIG. 20 is a schematic view of a logical-physical mapping table before/after trimming operation is performed according to an exemplary embodiment.

More specifically, FIG. 20 is a schematic view of a L2P table before/after trimming operation is performed according to an exemplary embodiment.

Referring to FIG. 20, a L2P table 2500-1 shows a mapping relationship between the logical address and the physical address according to the state shown in FIG. 19, wherein the left field indicates serial number of logical address, and the right field indicates serial number of mapped PPU.

The L2P table 2500-2 is the mapping relationship between the logical address and the physical address after activating trimming operation according to the trim command record TL. Specifically, the MMC 502 changes the mapping of the $0^{th}$ logical address of the logical block address LBA(0) in the L2P table 2500-1 into null according to the logical address (i.e., the $0^{th}$ logical address of the logical block address LBA(0)) recorded in the trim command record TL.

Figure 21:
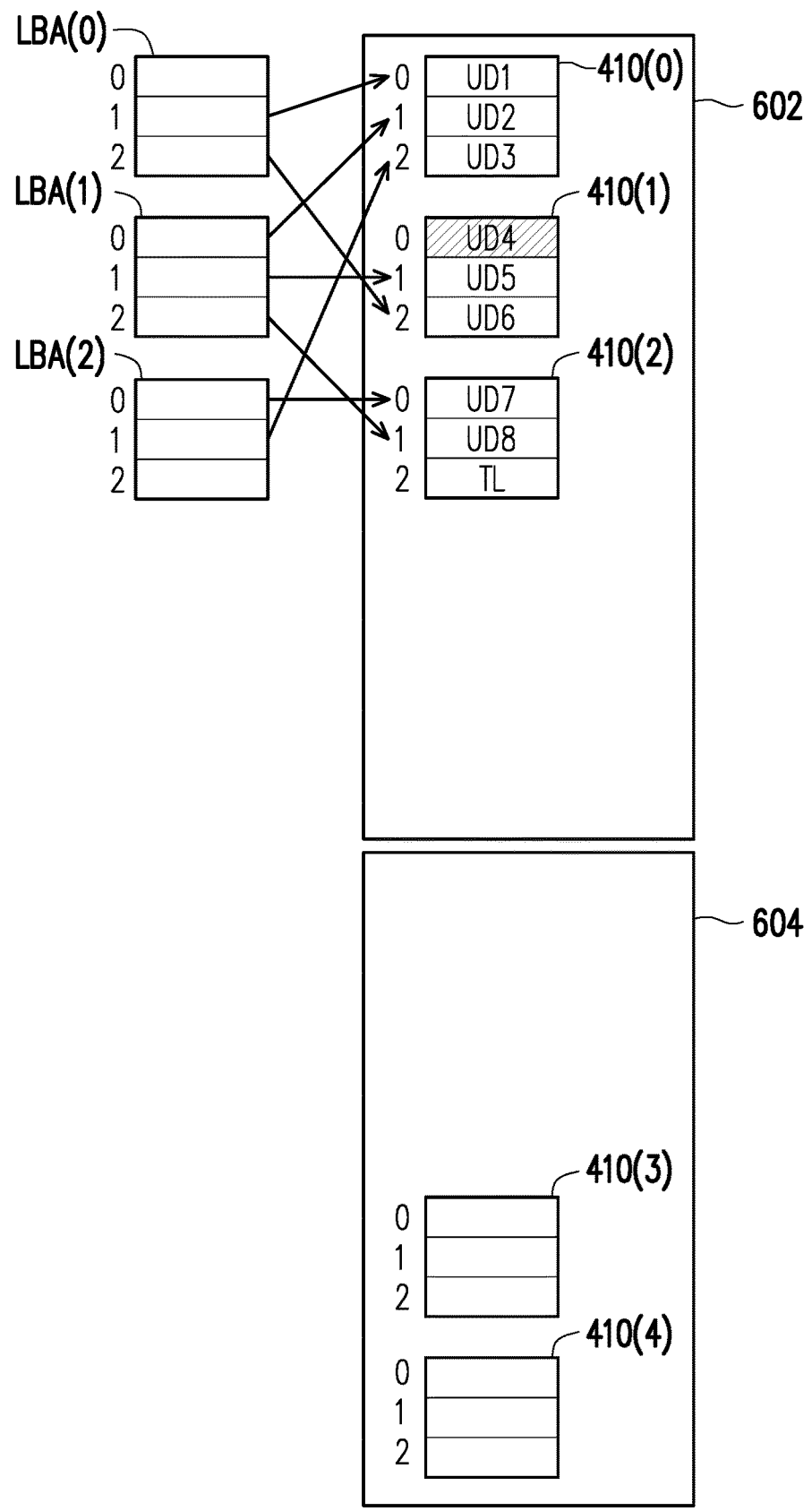
FIG. 21 is a schematic view of a mapping state between a logical address and a physical address after a trimming operation is performed according to an exemplary embodiment.

Therefore, FIG. 21 is a schematic view of a mapping state between a logical address and a physical address after a trimming operation is performed according to an exemplary embodiment.

Referring to FIG. 21, when the MMC 502 changes the mapping of the $0^{th}$ logical address of the logical block address LBA(0) in the L2P table 2500-1 into null according to the logical address (i.e., the $0^{th}$ logical address of the logical block address LBA(0)) recorded in the trim command record TL, the $0^{th}$ logical address of the logical block address LBA(0) is not mapped to the $0^{th}$ PPU of the PEU 410(1). Accordingly, the data UD4 stored in the $0^{th}$ PPU of the PEU 410(1) is identified as invalid data. Thereafter, when the MMC 502, for example, performs garage collection operation, the MMC 502 does not move the data UD4 stored in the $0^{th}$ PPU of the PEU 410(1).

Additionally, in an embodiment, the MMC 502 further marks the $2^{nd}$ PPU of the PEU 410(2) to represent that the PPU is used for storing trim command record TL. For example, the MMC 502 stores information regarding the $2^{nd}$ PPU of the PEU 410(2) used for storing trim command record TL in the system area 606. When the memory storage device 10 is power-on, the MMC 502 can quickly find the PPU used for storing trim command record TL according to the marked PPU.

Figure 22:
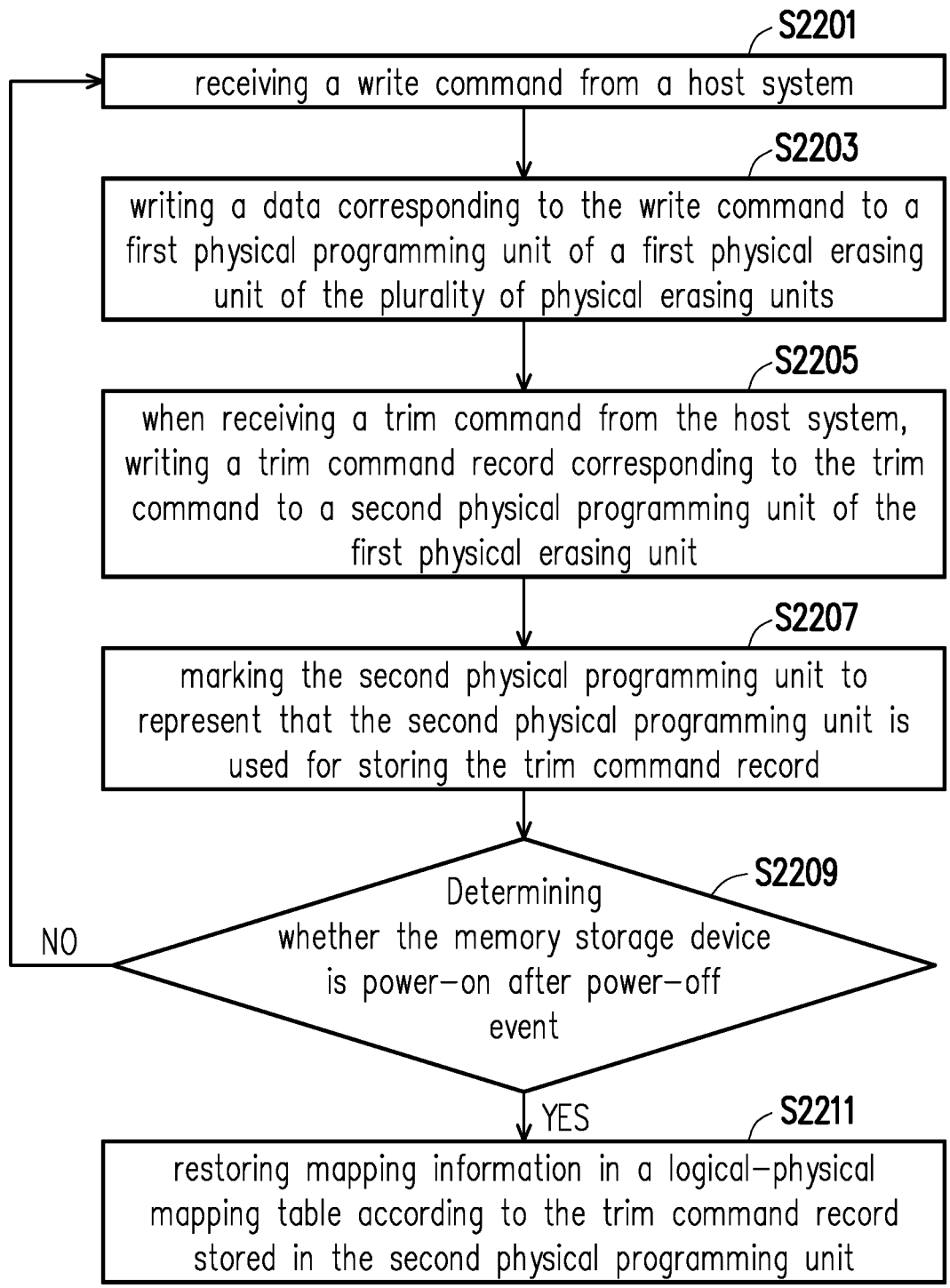
FIG. 22 is a flowchart of a trim command recording method according to an exemplary embodiment.

FIG. 22 is a flowchart of a trim command recording method according to an exemplary embodiment.

Referring to FIG. 22, in step S2201, the MMC 502 receives the write command from the host system 11. In step S2203, the MMC 502 writes the data corresponding to the write command to the first PPU of the first PEU of the plurality of PEUs. In step S2205, when the MMC 502 receives the trim command from the host system 11, the MMC 502 writes the trim command record corresponding to the trim command to the second PPU of the first PEU. Thereafter, in step S2207, the MMC 502 marks the second PPU to represent that the second PPU is used for storing trim command record. Then, in step S2209, the MMC 502 determines whether the memory storage device 10 is power-on after the power-off event. When the power-off event is not occurred to the memory storage device 10, step S2201 may be resumed. When the memory storage device 10 is power-on after the power-off event, in step S2211, the MMC 502 restores the mapping information in the L2P table according to the trim command record stored in the second PPU.

In summary, the trim command recording method, the memory control circuit unit and the memory storage device of the invention are capable of storing the trim command record corresponding to the trim command in the PEU that is currently used for writing operation when the MMC 502 receives the trim command. When the memory storage device 10 is power-on after the abnormal power-off event, the MMC 502 is capable of restoring the mapping information in the L2P table according to the stored trim command record, thereby avoiding the problem that trimming operation cannot be performed properly caused by loss of information in the trim table after the abnormal power-off event.

Although the invention has been disclosed by the above embodiments, the embodiments are not intended to limit the invention. It will be apparent to those skilled in the art that various modifications and variations can be made to the structure of the invention without departing from the scope or spirit of the invention. Therefore, the protecting range of the invention falls in the appended claims.

What is claimed is:

1. A trim command recording method for a memory storage device, the memory storage device having a rewritable non-volatile memory module, the rewritable non-volatile memory module comprising a plurality of physical erasing units, each of the plurality of physical erasing units comprising a plurality of physical programming units, the trim command recording method comprising:
   receiving a write command from a host system;
   writing a data corresponding to the write command to a first physical programming unit of a first physical erasing unit of the plurality of physical erasing units; and
   writing a trim command record corresponding to the trim command to a second physical programming unit of the first physical erasing unit in response to a trim command from the host system, wherein a first logical address and a mapping relationship between the first logical address and a physical address mapping to the first logical address are recorded in the trim command record and the trim command indicates data stored at the first logical address has been deleted.

2. The trim command recording method according to claim 1, wherein the trim command record records information regarding deletion of the data on the first logical address.

3. The trim command recording method according to claim 2, further comprising:
   powering the memory storage device on after a power-off event, and then restoring a plurality of mapping information in a logical-physical mapping table according to the trim command record stored in the second physical programming unit.

4. The trim command recording method according to claim 3, wherein the step of restoring the plurality of mapping information in the logical-physical mapping table according to the trim command record stored in the second physical programming unit comprises:
   changing mapping corresponding to the first logical address indicated by the trim command in the logical-physical mapping table into a null.

5. The trim command recording method according to claim 1, further comprising:
   marking the second physical programming unit to represent that the second physical programming unit is used for storing the trim command record.

6. A memory control circuit unit comprising:
   a host interface coupled to a host system;
   a memory interface coupled to a rewritable non-volatile memory module, wherein the rewritable non-volatile memory module comprises a plurality of physical erasing units, each of the plurality of physical erasing units comprises a plurality of physical programming units; and
   a memory management circuit coupled to the host interface and the memory interface,
   wherein the memory management circuit is configured to receive a write command from the host system,
   wherein the memory management circuit is further configured to write a data corresponding to the write command to a first physical programming unit of a first physical erasing unit of the plurality of physical erasing units,
   wherein the memory management circuit is further configured to write a trim command record corresponding to the trim command to a second physical programming unit of the first physical erasing unit in response to a trim command from the host system, wherein a first logical address and a mapping relationship between the first logical address and a physical address mapping to the first logical address are recorded in the trim command record and the trim command indicates data stored at the first logical address has been deleted.

7. The memory management circuit according to claim 6, wherein the trim command record records information regarding deletion of the data on the first logical address.

8. The memory control circuit unit according to claim 7, wherein when the memory control circuit unit is powered on after a power-off event, the memory management circuit is further configured to restore a plurality of mapping information in a logical-physical mapping table according to the trim command record stored in the second physical programming unit.

9. The memory control circuit unit according to claim 8, wherein in the operation of restoring the plurality of mapping information in the logical-physical mapping table according to the trim command record stored in the second physical programming unit, the memory management circuit is further configured to change mapping corresponding to the first logical address indicated by the trim command in the logical-physical mapping table into a null.

10. The memory control circuit unit according to claim 6, wherein the memory management circuit is further configured to mark the second physical programming unit to represent that the second physical programming unit is used for storing the trim command record.

11. A memory storage device comprising:
   a connecting interface unit coupled to a host system;
   a rewritable non-volatile memory module having a plurality of physical erasing units, each of the plurality of physical erasing units comprising a plurality of physical programming units; and
   a memory control circuit unit coupled to the connecting interface unit and the rewritable non-volatile memory module,
   wherein the memory control circuit unit is configured to receive a write command from the host system,
   wherein the memory control circuit unit is further configured to write a data corresponding to the write command to a first physical programming unit of a first physical erasing unit of the plurality of physical erasing units,
   wherein the memory control circuit unit is further configured to write a trim command record corresponding to the trim command to a second physical programming unit of the first physical erasing unit in response to a trim command from the host system, wherein a first logical address and a mapping relationship between the first logical address and a physical address mapping to the first logical address are recorded in the trim command record and the trim command indicates data stored at the first logical address has been deleted.

12. The memory storage device according to claim 11, wherein the trim command record records information regarding deletion of the data on the first logical address.

13. The memory storage device according to claim 12, wherein when the memory storage device is powered on after a power-off event, the memory control circuit unit is further configured to restore a plurality of mapping information in a logical-physical mapping table according to the trim command record stored in the second physical programming unit.

14. The memory storage device according to claim 13, wherein in the operation of restoring the plurality of mapping information in the logical-physical mapping table according to the trim command record stored in the second physical programming unit, the memory control circuit unit is further configured to change mapping corresponding to the first logical address indicated by the trim command in the logical-physical mapping table into a null.

15. The memory storage device according to claim 11, wherein the memory control circuit unit is further configured to mark the second physical programming unit to represent that the second physical programming unit is used for storing the trim command record.

* * * * *